US012731222B2

(12) United States Patent
Jang et al.

(10) Patent No.: US 12,731,222 B2
(45) Date of Patent: Sep. 8, 2026

(54) IMAGE PROCESSING DEVICE AND OPERATING METHOD THEREOF

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Soongeun Jang, Suwon-si (KR); Changick Kim, Daejeon (KR); Woo-Shik Kim, Suwon-si (KR); Hongkyu Park, Suwon-si (KR); Sangyun Lee, Suwon-si (KR); Sangyoon Lee, Suwon-si (KR); Junho Lee, Suwon-si (KR); Minbeom Kim, Daejeon (KR); Yooseung Wang, Daejeon (KR); Jaehyuk Jang, Daejeon (KR); Seungjun Jeong, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 124 days.

(21) Appl. No.: 18/925,657

(22) Filed: Oct. 24, 2024

(65) Prior Publication Data

US 2025/0131533 A1 Apr. 24, 2025

(30) Foreign Application Priority Data

Oct. 24, 2023 (KR) ........................ 10-2023-0143172

(51) Int. Cl.
*G06T 3/4015* (2024.01)
*G06T 3/4053* (2024.01)
(Continued)

(52) U.S. Cl.
CPC .............. *G06T 5/50* (2013.01); *G06T 3/4015* (2013.01); *G06T 3/4053* (2013.01); *G06T 7/11* (2017.01);
(Continued)

(58) Field of Classification Search
CPC ........ G06T 3/4015; G06T 3/4053; G06T 7/11
See application file for complete search history.

(56) References Cited

U.S. PATENT DOCUMENTS 11,836,889 B2 * 12/2023 Smirnov ............... G06T 3/4015
2014/0009469 A1 1/2014 Shin et al.
(Continued)

FOREIGN PATENT DOCUMENTS

EP 3 745 309 A1 12/2020
KR 10-2014-0007511 A 1/2014
(Continued)

OTHER PUBLICATIONS

Yichen Wu et al., "Demosaiced pixel super-resolution for multiplexed holographic color imaging", Scientific Reports, vol. 6, Article No. 28601, Jun. 29, 2016, 9 pages, DOI: 10.1038/srep28601.
(Continued)

*Primary Examiner* — Matthew Salvucci
(74) *Attorney, Agent, or Firm* — Sughrue Mion, PLLC

(57) ABSTRACT

An image processing device includes an image sensor including a unit block including a plurality of pixels arranged adjacent to each other, wherein a plurality of nano-posts are arranged on the unit block, and a processor that processes an input image acquired through the image sensor.

20 Claims, 20 Drawing Sheets

(51) Int. Cl.

| | |
|---|---|
| ***G06T 5/50*** | (2006.01) |
| ***G06T 7/11*** | (2017.01) |
| ***G06V 10/44*** | (2022.01) |
| ***G06V 10/60*** | (2022.01) |
| ***H04N 1/60*** | (2006.01) |

(52) U.S. Cl.

CPC .............. *G06V 10/44* (2022.01); *G06V 10/60* (2022.01); *H04N 1/6008* (2013.01); *G06T 2207/20221* (2013.01)

(56) References Cited

U.S. PATENT DOCUMENTS

| | | | | |
|---|---|---|---|---|
| 2021/0133925 | A1 | 5/2021 | Lee et al. | |
| 2022/0046215 | A1* | 2/2022 | Cha | H04N 23/88 |
| 2024/0249513 | A1 | 7/2024 | Jang et al. | |
| 2025/0048766 | A1 | 2/2025 | Cho et al. | |

FOREIGN PATENT DOCUMENTS

| | | | |
|---|---|---|---|
| KR | 10-2022-006040 | A | 5/2022 |
| KR | 10-2024-0117327 | A | 8/2024 |

OTHER PUBLICATIONS

Jingyun Liang et al., “SwinIR: Image Restoration Using Swin Transformer”, Proceedings of 2021 IEEE/CVF International Conference on Computer Vision Workshops (ICCVW), 12 pages, arXiv:2108.10257v1 [eess.IV] Aug. 23, 2021.

Wenming Yang et al., “Deep Learning for Single Image Super-Resolution: A Brief Review”, IEEE Transactions on Multimedia, vol. 21, No. 12, Dec. 2019, pp. 3106-3121, DOI: 10.1109/TMM.2019.2919431.

Xintao Wang et al., “ESRGAN: Enhanced Super-Resolution Generative Adversarial Networks”, Proceedings of European Conference on Computer Vision (ECCV) 2018 Workshops, 23 pages, arXiv:1809.00219v2 [cs.CV] Sep. 17, 2018.

Hang Zhang et al., “Deep TEN: Texture Encoding Network”, Proceedings of 2017 IEEE Conference on Computer Vision and Pattern Recognition (CVPR), arXiv:1612.02844v1 [cs.CV] Dec. 8, 2016.

Yusuke Monno et al., “Adaptive Residual Interpolation for Color and Multispectral Image Demosaicking”, Sensors, vol. 17, No. 12, Article No. 2787, Dec. 1, 2017, 21 pages, DOI: 10.3390/s17122787.

* cited by examiner

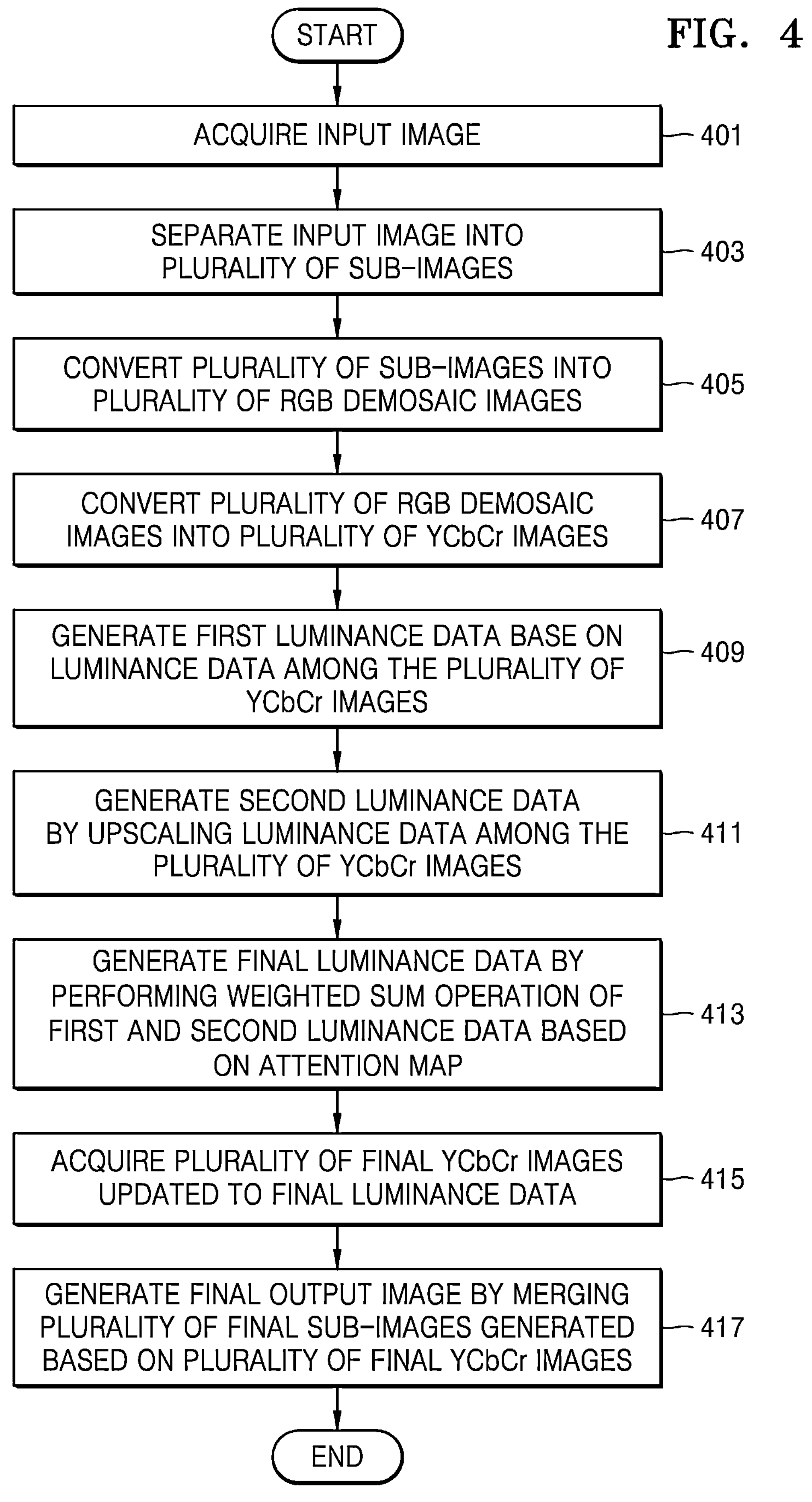
FIG. 4
START
ACQUIRE INPUT IMAGE
401
SEPARATE INPUT IMAGE INTO PLURALITY OF SUB-IMAGES
403
CONVERT PLURALITY OF SUB-IMAGES INTO PLURALITY OF RGB DEMOSAIC IMAGES
405
CONVERT PLURALITY OF RGB DEMOSAIC IMAGES INTO PLURALITY OF YCbCr IMAGES
407
GENERATE FIRST LUMINANCE DATA BASE ON LUMINANCE DATA AMONG THE PLURALITY OF YCbCr IMAGES
409
GENERATE SECOND LUMINANCE DATA BY UPSCALING LUMINANCE DATA AMONG THE PLURALITY OF YCbCr IMAGES
411
GENERATE FINAL LUMINANCE DATA BY PERFORMING WEIGHTED SUM OPERATION OF FIRST AND SECOND LUMINANCE DATA BASED ON ATTENTION MAP
413
ACQUIRE PLURALITY OF FINAL YCbCr IMAGES UPDATED TO FINAL LUMINANCE DATA
415
GENERATE FINAL OUTPUT IMAGE BY MERGING PLURALITY OF FINAL SUB-IMAGES GENERATED BASED ON PLURALITY OF FINAL YCbCr IMAGES
417
END

| 131 | 132 | 131 | 132 | 131 | 132 | 131 | 132 |
|---|---|---|---|---|---|---|---|
| 133 | 134 | 133 | 134 | 133 | 134 | 133 | 134 |
| 131 | 132 | 131 | 132 | 131 | 132 | 131 | 132 |
| 133 | 134 | 133 | 134 | 133 | 134 | 133 | 134 |
| 131 | 132 | 131 | 132 | 131 | 132 | 131 | 132 |
| 133 | 134 | 133 | 134 | 133 | 134 | 133 | 134 |
| 131 | 132 | 131 | 132 | 131 | 132 | 131 | 132 |
| 133 | 134 | 133 | 134 | 133 | 134 | 133 | 134 |

| $g_{11}$ | $g_{12}$ | $b_{13}$ | $b_{14}$ | $g_{15}$ | $g_{16}$ | $b_{17}$ | $b_{18}$ | $g_{19}$ | $g_{20}$ | $b_{21}$ | $b_{22}$ |
|---|---|---|---|---|---|---|---|---|---|---|---|
| $g_{21}$ | $g_{22}$ | $b_{23}$ | $b_{24}$ | $g_{25}$ | $g_{26}$ | $b_{27}$ | $b_{28}$ | $g_{29}$ | $g_{30}$ | $b_{31}$ | $b_{32}$ |
| $r_{31}$ | $r_{32}$ | $g_{33}$ | $g_{34}$ | $r_{35}$ | $r_{36}$ | $g_{37}$ | $g_{38}$ | $r_{39}$ | $r_{40}$ | $g_{41}$ | $g_{42}$ |
| $r_{41}$ | $r_{42}$ | $g_{43}$ | $g_{44}$ | $r_{45}$ | $r_{46}$ | $g_{47}$ | $g_{48}$ | $r_{49}$ | $r_{50}$ | $g_{51}$ | $g_{52}$ |
| $g_{51}$ | $g_{52}$ | $b_{53}$ | $b_{54}$ | $g_{55}$ | $g_{55}$ | $b_{57}$ | $b_{58}$ | $g_{59}$ | $g_{60}$ | $b_{61}$ | $b_{62}$ |
| $g_{61}$ | $g_{62}$ | $b_{63}$ | $b_{64}$ | $g_{65}$ | $g_{66}$ | $b_{67}$ | $b_{68}$ | $g_{69}$ | $g_{70}$ | $b_{71}$ | $b_{72}$ |
| $r_{71}$ | $r_{72}$ | $g_{73}$ | $g_{74}$ | $r_{75}$ | $r_{76}$ | $g_{77}$ | $g_{78}$ | $r_{79}$ | $r_{80}$ | $g_{81}$ | $g_{82}$ |
| $r_{81}$ | $r_{82}$ | $g_{83}$ | $g_{84}$ | $r_{85}$ | $r_{86}$ | $g_{87}$ | $g_{88}$ | $r_{89}$ | $r_{90}$ | $g_{91}$ | $g_{92}$ |
| $g_{91}$ | $g_{92}$ | $b_{93}$ | $b_{94}$ | $g_{95}$ | $g_{96}$ | $b_{97}$ | $b_{98}$ | $g_{99}$ | $g_{100}$ | $b_{101}$ | $b_{102}$ |
| $g_{101}$ | $g_{102}$ | $b_{103}$ | $b_{104}$ | $g_{105}$ | $g_{106}$ | $b_{107}$ | $b_{108}$ | $g_{109}$ | $g_{110}$ | $b_{111}$ | $b_{112}$ |
| $r_{111}$ | $r_{112}$ | $g_{113}$ | $g_{114}$ | $r_{115}$ | $r_{116}$ | $g_{117}$ | $g_{118}$ | $r_{119}$ | $r_{120}$ | $g_{121}$ | $g_{122}$ |
| $r_{121}$ | $r_{122}$ | $g_{123}$ | $g_{124}$ | $r_{125}$ | $r_{126}$ | $g_{127}$ | $g_{128}$ | $r_{129}$ | $r_{130}$ | $g_{131}$ | $g_{132}$ |

| | | | | | |
|---|---|---|---|---|---|
| $g_{11}$ | $b_{13}$ | $g_{15}$ | $b_{17}$ | $g_{19}$ | $b_{21}$ |
| $r_{31}$ | $g_{33}$ | $r_{35}$ | $g_{37}$ | $r_{39}$ | $g_{41}$ |
| $g_{51}$ | $b_{53}$ | $g_{55}$ | $b_{57}$ | $g_{59}$ | $b_{61}$ |
| $r_{71}$ | $g_{73}$ | $r_{75}$ | $g_{77}$ | $r_{79}$ | $g_{81}$ |
| $g_{91}$ | $b_{93}$ | $g_{95}$ | $b_{97}$ | $g_{99}$ | $b_{101}$ |
| $r_{111}$ | $g_{113}$ | $r_{115}$ | $g_{117}$ | $r_{119}$ | $g_{121}$ |

FIG. 8B 802G
800A

| | | | | | |
|---|---|---|---|---|---|
| $g_{12}$ | $b_{14}$ | $g_{16}$ | $b_{18}$ | $g_{20}$ | $b_{22}$ |
| $r_{32}$ | $g_{34}$ | $r_{36}$ | $g_{38}$ | $r_{40}$ | $g_{42}$ |
| $g_{52}$ | $b_{54}$ | $g_{66}$ | $b_{58}$ | $g_{60}$ | $b_{62}$ |
| $r_{72}$ | $g_{74}$ | $r_{76}$ | $g_{78}$ | $r_{80}$ | $g_{82}$ |
| $g_{92}$ | $b_{94}$ | $g_{96}$ | $b_{98}$ | $g_{100}$ | $b_{102}$ |
| $r_{112}$ | $g_{114}$ | $r_{116}$ | $g_{118}$ | $r_{120}$ | $g_{122}$ |

FIG. 8C

| | | | | | |
|---|---|---|---|---|---|
| $g_{21}$ | $b_{23}$ | $g_{25}$ | $b_{27}$ | $g_{29}$ | $b_{31}$ |
| $r_{41}$ | $g_{43}$ | $r_{45}$ | $g_{47}$ | $r_{49}$ | $g_{51}$ |
| $g_{61}$ | $b_{63}$ | $g_{65}$ | $b_{67}$ | $g_{69}$ | $b_{71}$ |
| $r_{81}$ | $g_{83}$ | $r_{85}$ | $g_{87}$ | $r_{89}$ | $g_{91}$ |
| $g_{101}$ | $b_{103}$ | $g_{105}$ | $b_{107}$ | $g_{109}$ | $b_{111}$ |
| $r_{121}$ | $g_{123}$ | $r_{125}$ | $g_{127}$ | $r_{129}$ | $g_{131}$ |

FIG. 8D 804G
800D

| $g_{22}$ | $b_{24}$ | $g_{26}$ | $b_{28}$ | $g_{30}$ | $b_{32}$ |
|---|---|---|---|---|---|
| $r_{42}$ | $g_{44}$ | $r_{46}$ | $g_{48}$ | $r_{50}$ | $g_{52}$ |
| $g_{62}$ | $b_{64}$ | $g_{66}$ | $b_{68}$ | $g_{70}$ | $b_{72}$ |
| $r_{82}$ | $g_{84}$ | $r_{86}$ | $g_{88}$ | $r_{90}$ | $g_{92}$ |
| $g_{102}$ | $b_{104}$ | $g_{106}$ | $b_{108}$ | $g_{110}$ | $b_{112}$ |
| $r_{122}$ | $g_{124}$ | $r_{126}$ | $g_{128}$ | $r_{130}$ | $g_{132}$ |

Figure 11:
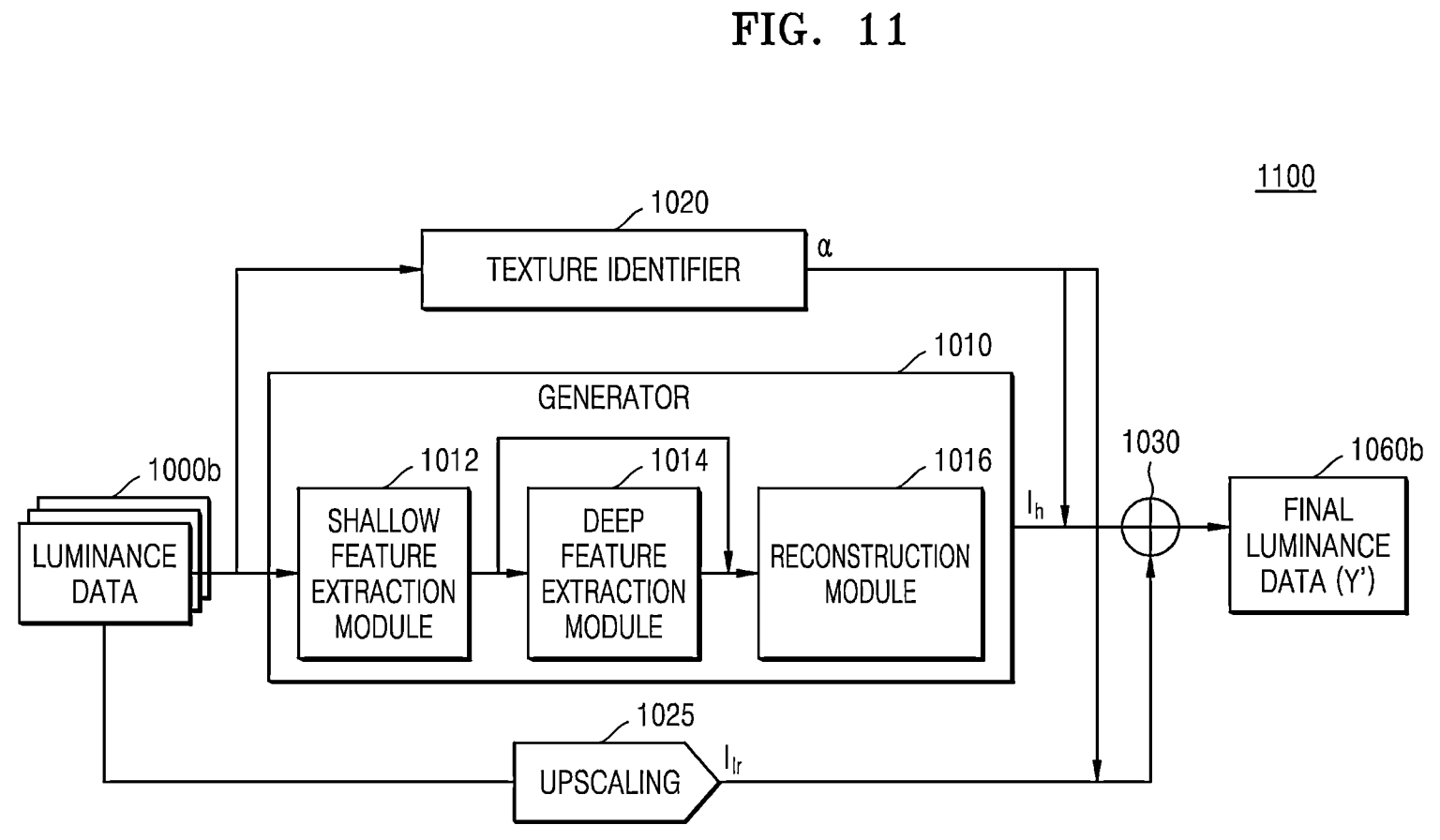

LUMINANCE DATA 1000b

TEXTURE IDENTIFIER 1020

α

GENERATOR 1010

SHALLOW FEATURE EXTRACTION MODULE 1012

DEEP FEATURE EXTRACTION MODULE 1014

RECONSTRUCTION MODULE 1016

$I_h$

UPSCALING 1025

$I_{lr}$

1030

FINAL LUMINANCE DATA (Y') 1060b

IMAGE PROCESSING DEVICE AND OPERATING METHOD THEREOF

CROSS-REFERENCE TO RELATED APPLICATION

This application is based on and claims priority under 35 U.S.C. § 119 to Korean Patent Application No. 10-2023-0143172, filed on Oct. 24, 2023, in the Korean Intellectual Property Office, the disclosure of which is incorporated by reference herein in its entirety.

BACKGROUND

1. Field

One or more aspects of the disclosure the disclosure relate to an image processing device and an operating method thereof, and more particularly, to an image processing device capable of processing an input image obtained through an image sensor.

2. Description of the Related Art

Generally, an image sensor may include a color filter layer arranged on a plurality of single pixels. The color filter layer transmits only red, green, and blue in each pixel in which red, green, and blue filters are arranged, and absorbs light of the remaining colors. In a Complementary Metal Oxide Semiconductor (CMOS) image sensor or charge coupled device (CCD) image sensor, 50% of green (G) filters, 25% of red (R) filters, and 25% of blue (B) filters may be alternately arranged, and this arrangement structure corresponds to a Bayer pattern.

Recently, research on algorithms using artificial intelligence has been underway to improve the resolution of images acquired through image sensors. For example, various studies have been conducted on an algorithm that learns and evaluates multiple images captured through an image sensor including a microlens.

SUMMARY

Despite the development of image sensors of various structures, in a case in which a related art high-resolution algorithm related to an image sensor including microlenses is applied to an image sensor including a meta prism in a same manner, an image having a target resolution may not be obtained. For example, unlike microlenses with a convex center, a meta prism with multiple cylindrical nano-posts acquires images containing wide-angle light information rather than images acquired through microlenses. However, in a case in which the related art high-resolution algorithm applied to an image sensor including a microlens is applied to an image sensor including a meta prism, a first target high-resolution image may not be obtained.

Accordingly, provided are an image processing device and method for processing an input image acquired through an image sensor through a high-resolution algorithm that may be applied to the image sensor including a meta prism.

The technical objective to be achieved by the disclosure is not limited to the technical objectives as described above, and other technical objectives may be inferred from the following embodiments.

Additional aspects will be set forth in part in the description which follows and, in part, will be apparent from the description, or may be learned by practice of the presented embodiments of the disclosure.

According to an aspect of the disclosure, there is provided an image processing device including: an image sensor including a unit block comprising a plurality of pixels arranged adjacent to each other, and a plurality of nano-posts arranged on the unit block; and a processor configured to process an input image acquired through the image sensor by: dividing the input image into a plurality of first sub-images of a Bayer pattern including pixels having a same parallax among the plurality of pixels included in the input image; converting the plurality of first sub-images into a plurality of RGB demosaic images; converting the plurality of RGB demosaic images into a plurality of YCbCr images including first luminance data and color difference data; generating second luminance data by applying the first luminance data, from among the plurality of YCbCr images, to a super resolution algorithm; generating third luminance data by upscaling the first luminance data; generating fourth luminance data by performing a weighted sum operation on the second luminance data and the third luminance data based on an attention map generated by the super resolution algorithm; acquiring a plurality of second YCbCr images by updating the first luminance data of the plurality of YCbCr images to the fourth luminance data; and generating an output image by merging a plurality of second sub-images generated based on the plurality of second YCbCr images.

The super resolution algorithm may be an algorithm trained through a generator that learns a data distribution of a plurality of pieces of luminance data and a discriminator that learns to distinguish luminance data of an original image from luminance data generated by the generator.

The generator may include a shallow feature extraction module, a deep feature extraction module, and a reconstruction module, and the reconstruction module may include a sub-pixel convolution layer.

The shallow feature extraction module may include at least one convolution layer configured to extract features for a low-resolution image from the plurality of pieces of luminance data input to the generator.

The deep feature extraction module may include at least one residual block and at least one convolution layer configured to extract features for an ultra-high-resolution image from the plurality of pieces of luminance data input to the generator.

The reconstruction module may be configured to generate the second luminance data by decoding, through the sub-pixel convolution layer, information in which first information extracted through the shallow feature extraction module and second information extracted through the deep feature extraction module are encoded.

The attention map may be generated by a texture identifier of the super resolution algorithm, the texture identifier being a network in which a data set for a plurality of textures have been trained, and the attention map may include weight values of each of a plurality of labels labeled in the data set for the plurality of textures.

The processor may be further configured to: acquire first data by multiplying, by the attention map, the second luminance data generated by passing the first luminance data through the generator; acquire second data by multiplying a value obtained by subtracting the attention map from 1 by the third luminance data; and generate the fourth luminance data by summing the second data and the third data.

The unit block may be arranged in a 2×2 matrix and may include four pixels each including a color filter of a same color.

The unit block may include a plurality of unit blocks, and wherein the image sensor has a quad Bayer pattern array in which the plurality of unit blocks are arranged in a 2×2 matrix.

The quad Bayer pattern array may have one of an RGGB pattern, a GBRG pattern, a GRBG pattern, or a BGGR pattern.

The processor may be further configured to: convert the plurality of second YCbCr images into a plurality of final RGB images; convert the plurality of final RGB images into the plurality of second sub-images; and generate the output image by merging the plurality of second sub-images.

According to another aspect of the disclosure, there is provided an operating method of an image processing device, the operating method including: acquiring an input image through an image sensor including a unit block including a plurality of pixels arranged adjacent to each other, and a plurality of nano-posts arranged on the unit block; dividing the input image into a plurality of first sub-images of a Bayer pattern including pixels having a same parallax among the plurality of pixels included in the input image; converting the plurality of first sub-images into a plurality of RGB demosaic images; converting the plurality of RGB demosaic images into a plurality of YCbCr images including first luminance data and color difference data; generating second luminance data by applying the first luminance data, from among the plurality of YCbCr images, to a super resolution algorithm; generating third luminance data by upscaling the luminance data; generating fourth luminance data by performing a weighted sum operation on the second luminance data and the third luminance data based on an attention map generated by the super resolution algorithm; acquiring a plurality of second YCbCr images by updating the first luminance data of the plurality of YCbCr images to the fourth luminance data; and generating an output image by merging a plurality of second sub-images generated based on the plurality of second YCbCr images.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a flowchart illustrating an image processing device processing an input image according to an embodiment;

FIG. 5 illustrates a plan view of a color separation lens array included in a pixel array of an image sensor according to an embodiment;

FIG. 7 is a plan view illustrating an input image of a tetra Q cell pattern input through a color separation lens array according to an embodiment;

FIGS. 8A-8D are plan views illustrating a plurality of sub images of a Bayer pattern in which the input image of FIG. 7 is separated;

FIG. 10 illustrates a block diagram illustrating a method of learning a super resolution algorithm according to an embodiment;

FIG. 11 illustrates a block diagram illustrating a method of obtaining final luminance data by applying luminance data to a super resolution algorithm;

DETAILED DESCRIPTION

Figure 1:
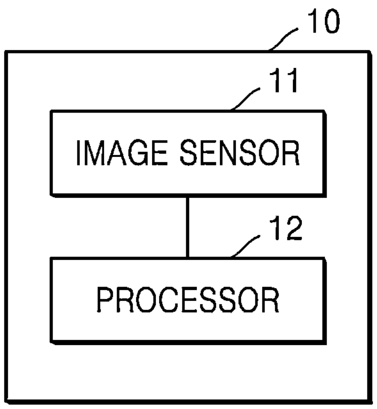
FIG. 1 illustrates a block diagram of an image processing device according to an embodiment.

Reference will now be made in detail to embodiments, examples of which are illustrated in the accompanying drawings, wherein like reference numerals refer to like elements throughout. In this regard, one or more embodiments of the disclosure may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the inventive concept will be described in detail with reference to the accompanying drawings. In the following drawings, the same reference numerals refer to the same components, and the size of each component in the drawings may be exaggerated for clarity and convenience of description. The embodiments described below are merely examples and various modifications are possible from these embodiments.

Hereinafter, the term "upper portion" or "on" may also include "to be present above on a non-contact basis" as well as "to be on the top portion in directly contact with". The singular expression includes plural expressions unless the context clearly implies otherwise. In addition, when a part "includes" a component, this means that it may further include other components, not excluding other components unless specifically stated to the contrary. The use of the term "the" and similar indicative terms may correspond to both singular and plural.

In addition, some embodiments are described in the accompanying drawings with respect to functional blocks, units and/or modules. Those skilled in the art will appreciate that these blocks, units and/or modules are physically implemented by logic circuits, discrete components, microprocessors, hard wire circuits, memory devices, wire connections, and other electronic circuits. This may be formed using semiconductor-based manufacturing technology or other manufacturing technology. For blocks, units, and/or modules implemented by a microprocessor or other similar hardware, the software programs may be programmed and controlled using software to perform various functions discussed herein, and may optionally be driven by firmware and/or software. In addition, each block, unit, and/or module may be implemented by dedicated hardware, or may be implemented as a combination of processors (e.g., one or more programmed microprocessors and associated circuits) that perform functions different from dedicated hardware performing some functions. In addition, in some embodiments, the blocks, units, and/or modules may be physically separated into two or more separate blocks, units, and/or modules that interact within the scope without departing from the scope of the inventive concept. In addition, in some embodiments, the blocks, units, and/or modules may be physically and more complex blocks, units, and/or modules within the scope without departing from the scope of the inventive concept.

FIG. 1 illustrates a block diagram of an image processing device according to an embodiment.

Referring to FIG. 1, an image processing device 10 may include an image sensor 11 and a processor 12. The image sensor 11 may be a charge coupled device (CCD) image sensor or a complementary metal oxide semiconductor (CMOS) image sensor.

According to an embodiment, the image sensor 11 may generate raw data for generating an image by converting light received from the outside into an electrical signal. In addition, the image sensor 11 may transmit the generated raw data to the processor 12. The processor 12 may include an image signal processor (ISP) that generates an image by using the received raw data. According to an embodiment, the image signal processor may be included in the image sensor 11.

According to an embodiment, the image sensor 11 may include a pixel array and a control circuit. In this case, the control circuit may include circuits that generate image data for controlling the pixel array, and may include, for example, a row driver, a readout circuit, a column driver, a control logic, and the like. According to an embodiment, the control circuit may be included in the processor 12.

According to an embodiment, the pixel array included in the image sensor 11 may include a plurality of pixels arranged in two dimensions along a plurality of rows and columns. In this case, the plurality of pixels may sense light having different wavelengths. For example, the pixel array may include a color separating lens array (CSLA) that allows light of different wavelengths to be incident on a plurality of pixels, and the CSLA may be implemented in a structure such as a meta prism (MP). The MP may include a plurality of nano-posts arranged in a specific rule so that light incident on the unit pixels may have a predetermined phase distribution.

According to an embodiment, the processor 12 may generate a final output image by processing the input image acquired through the image sensor 11. In an example case in which the image sensor 11 acquires an input image and transmits the acquired input image to the processor 12, the processor 12 may generate a final output image through a series of processing for the acquired input image, and details of the processing will be described later with reference to FIG. 4. For example, the image sensor 11 may include a CSLA in the form of a MP. Although FIG. 1 illustrates that the image processing device 10 includes an image sensor 11 and a processor 12, the disclosure is not limited thereto, and as such, according another embodiment, the image processing device may include one or more other components in addition to the image sensor 11 and the processor 12.

Figure 2:
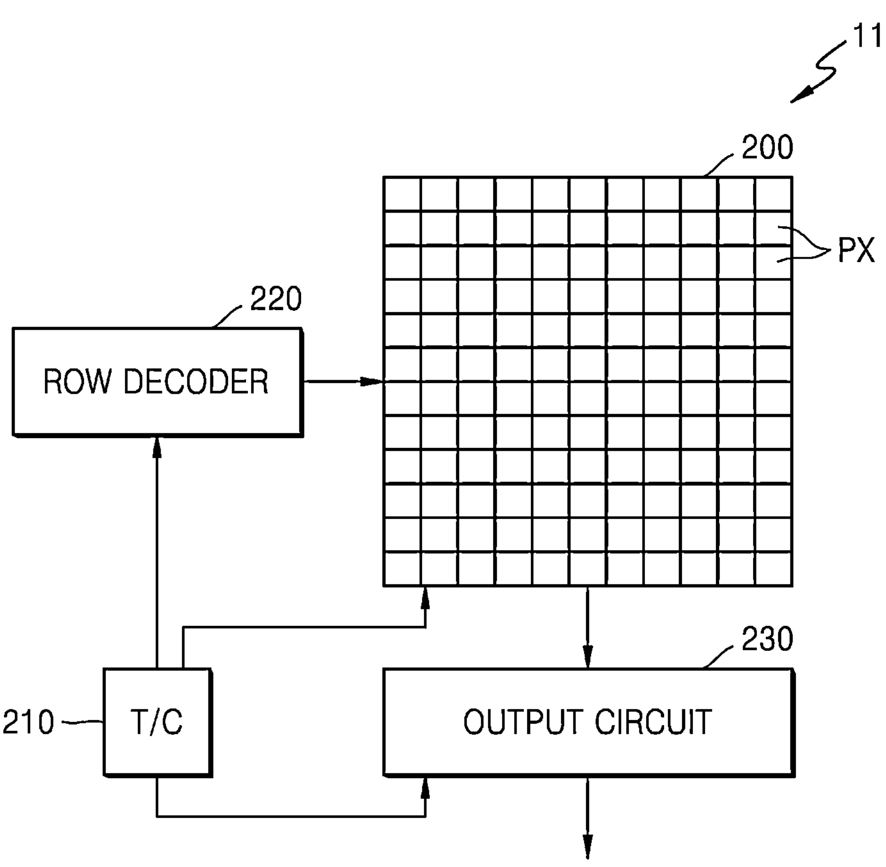
FIG. 2 illustrates a block diagram of an image sensor according to an embodiment.

FIG. 2 illustrates a block diagram of an image sensor according to an embodiment.

Referring to FIG. 2, the image sensor 11 may include a pixel array 200, a timing controller (T/C) 210, a row decoder 220, and an output circuit 230. Although FIG. 2 illustrates that the image sensor 11 includes a pixel array 200, a timing controller (T/C) 210, a row decoder 220, and an output circuit 230, the disclosure is not limited thereto, and as such, according another embodiment, the image sensor 11 may include one or more other components in addition to the components illustrated in FIG. 2.

According to an embodiment, the pixel array 200 may include pixels (PX) arranged in two dimensions along a plurality of rows and columns. The row decoder 220 may select one of the rows of the pixel array 200 based on a row address signal output from the timing controller 210. The output circuit 230 may output a light sensing signal in units of columns from a plurality of pixels arranged along the selected row. For example, the output circuit 230 may include a column decoder and an analog to digital converter (ADC). For example, the output circuit 230 may include a plurality of ADCs placed on each column between the column decoder and the pixel array 200, or one ADC placed on the output end of the column decoder.

According to an embodiment, the timing controller 210, the row decoder 220, and the output circuit 230 may be implemented as a single chip or a separate chip. The processor for processing the image signal output through the output circuit 230 may be implemented as a single chip along with the timing controller 210, the row decoder 220, and the output circuit 230.

According to an embodiment, the pixel array 200 may include a plurality of pixels PX that sense light having different wavelengths. The arrangement of pixels may be implemented in various ways. The pixel array 200 may include a color separation lens array that separates incident light by wavelength so that light of different wavelengths is incident to a plurality of pixels.

Figure 3A:
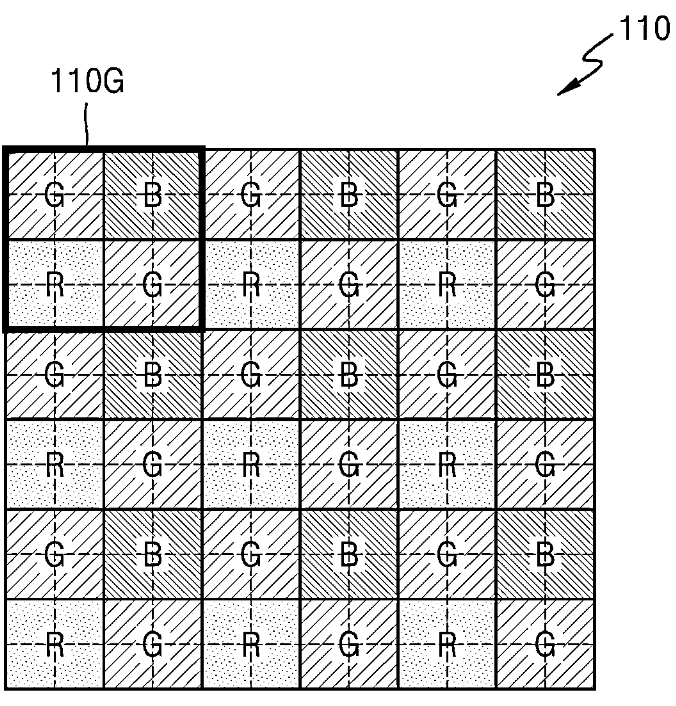
FIG. 3A is a plan view illustrating a color arrangement indicated by a pixel array of an image sensor according to an embodiment.

FIG. 3A is a plan view illustrating a color arrangement indicated by a pixel array of an image sensor according to an embodiment.

Referring to FIG. 3A, a pixel array (e.g., the pixel array 200 in FIG. 2) of an image sensor (e.g., the image sensor 11 in FIG. 1) may have a quad Bayer pattern array. For example, a sensor substrate 110 provided in the pixel array 200 may include a plurality of unit pixel groups 110G including four unit blocks.

According to an embodiment, a unit block may mean a unit structure including four pixels arranged in a 2×2 matrix and each including a color filter of a same color, and for example, the unit block may include a first green (G) block, a blue (B) block, a red (R) block, and a second green (G) block. In addition, in this disclosure, the unit pixel group 110G may mean a structure in which four unit blocks are arranged in a 2×2 matrix, and this structure may be referred to as a quad Bayer pattern or a tetra cell pattern.

According to an embodiment, the unit pixel group 110G may include two green (G) blocks, one blue (B) block, and one red (R) block. In this case, the four unit blocks may be arranged according to any one of the RGGB pattern, the GBRG pattern, the GRBG pattern, and the BGGR pattern in the order of the first row and first column, the first row and second column, the second row and first column, and the second row and second column. Although FIG. 3A shows that the sensor substrate 110 includes a plurality of unit pixel groups 110G of a GBRG pattern, the embodiments are not limited thereto, and the sensor substrate 110 may include a plurality of unit pixel groups having any one of an RGGB pattern, a GRBG pattern, and a BGGR pattern.

Figure 3B:
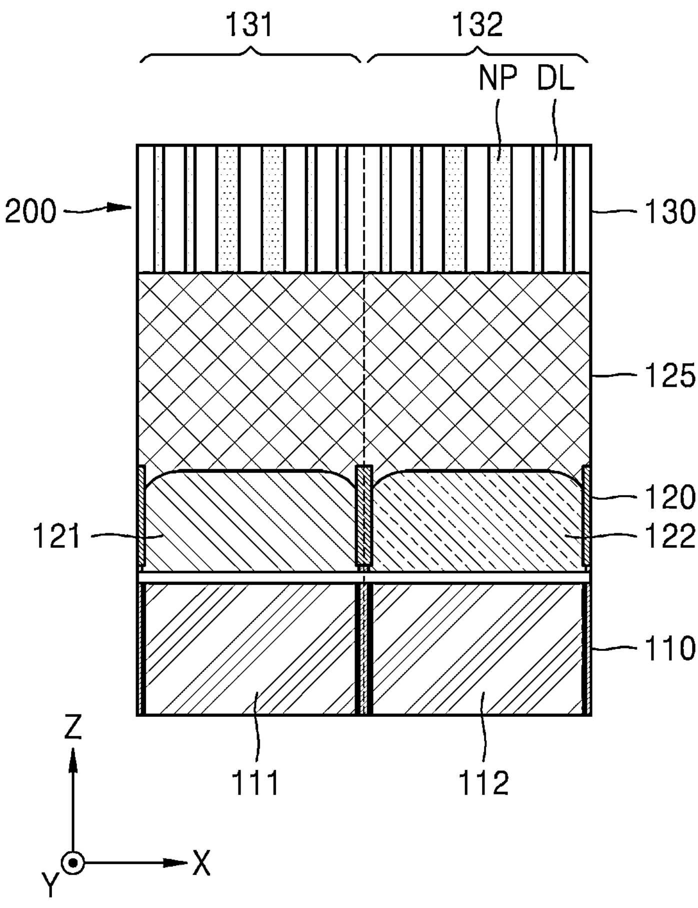
FIGS. 3B and 3C are cross-sectional views schematically illustrating a configuration of a pixel array of an image sensor according to an embodiment.
Figure 3C:
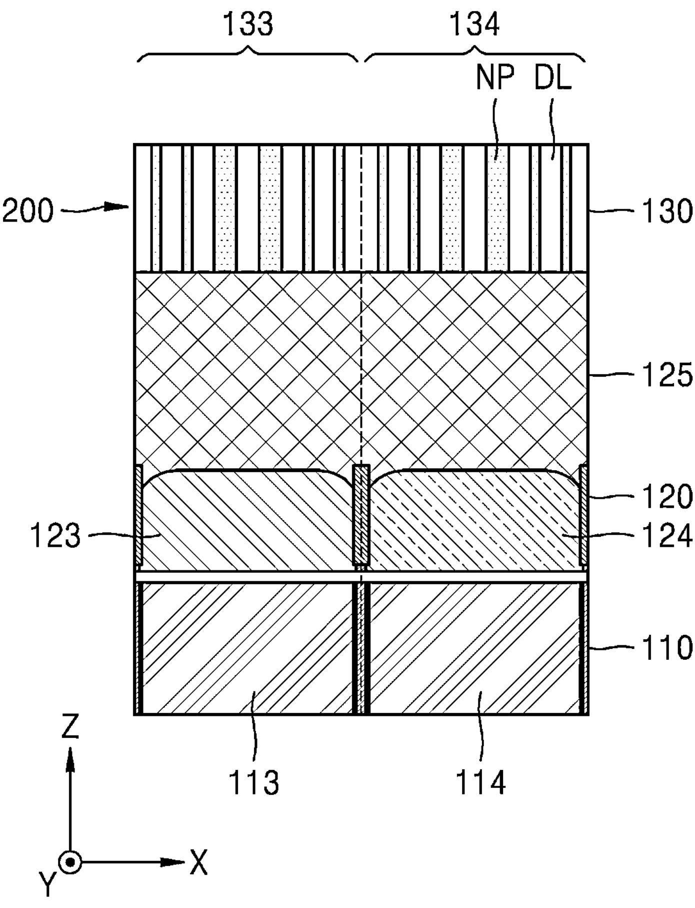

FIGS. 3B and 3C are cross-sectional views schematically illustrating a configuration of a pixel array of an image sensor according to an embodiment. FIG. 3B shows a cross section in which the pixel array 200 is cut along the first direction (i.e., X direction), and FIG. 3C shows a cross section in which the pixel array 200 is cut along the first direction (X direction) at a different position from the cross section position in FIG. 3B in the second direction (i.e., Y direction).

Referring to FIGS. 3B and 3C, the pixel array 200 may include a sensor substrate 110, a color filter layer 120 arranged on the sensor substrate 110, a transparent planarization layer 125 arranged on the color filter layer 120, and a color separation lens array 130 arranged on the planarization layer 125.

According to an embodiment, the sensor substrate 110 may include a plurality of pixels for sensing incident light. For example, the sensor substrate 110 may include a first pixel 111, a second pixel 112, a third pixel 113, and a fourth pixel 114 that generate an image signal by converting incident light into an electrical signal. The first pixel 111, the second pixel 112, the third pixel 113, and the fourth pixel 114 may form one unit pixel pattern. For example, the first pixel 111 and the fourth pixel 114 may be green pixels that sense green light, the second pixel 112 may be blue pixels that senses blue light, and the third pixel 113 may be red pixels that senses red light. A plurality of unit pixel patterns including the first pixel 111, the second pixel 112, the third pixel 113, and the fourth pixel 114 may be periodically and repeatedly arranged on the sensor substrate 110 in two dimensions along the first direction (X direction) and the second direction (Y direction). According to an embodiment, each of the first pixel 111, the second pixel 112, the third pixel 113, and the fourth pixel 114 may include one light sensing cell. For example, each of the first pixel 111, the second pixel 112, the third pixel 113, and the fourth pixel 114 may include one photodiode.

According to an embodiment, each of the first pixel 111, the second pixel 112, the third pixel 113, and the fourth pixel 114 may include a plurality of light sensing cells that independently sense incident light. In this case, each of the first pixel 111, the second pixel 112, the third pixel 113, and the fourth pixel 114 may include a plurality of photodiodes. For example, each of the first pixel 111, the second pixel 112, the third pixel 113, and the fourth pixel 114 may include first to fourth light sensing cells c1, c2, c3, and c4. The first to fourth light sensing cells c1, c2, c3, and c4 may be two-dimensionally arranged in the first direction and the second direction. For example, in each of the first pixel 111, the second pixel 112, the third pixel 113, and the fourth pixel 114, the first to fourth light sensing cells c1, c2, c3, and c4 may be arranged in a 2×2 array.

FIG. 4 is a flowchart illustrating an image processing device processing an input image according to an embodiment.

Referring to FIG. 4, according to an embodiment, in operation 401, the method may include acquiring an input image. For example, a processor (e.g., the processor 12 in FIG. 1) may acquire an input image through an image sensor (e.g., the image sensor 11 in FIG. 1).

According to an embodiment, the image sensor 11 may include a unit block including a plurality of pixels arranged adjacent to each other, and a plurality of nano-posts may be arranged on the unit block. In an example case, one unit block may be arranged in a 2×2 matrix and may include four pixels each including a color filter of a same color, and may correspond to any one of a green (G) block, a blue (B) block, and a red (R) block. In addition, four pixels including color filters of a same color included in one unit block may have different parallax.

For example, in one green (G) block, four pixels each including a green color filter may be arranged in a 2×2 matrix, and each of the four pixels may have a first parallax, a second parallax, a third parallax, and a fourth parallax. In addition, in one blue (B) block, four pixels each including a blue color filter may be arranged in a 2×2 matrix, and each of the four pixels may have a first parallax, a second parallax, a third parallax, and a fourth parallax. In addition, in one red (R) block, four pixels each including a red color filter may be arranged in a 2×2 matrix, and each of the four pixels may have a first parallax, a second parallax, a third parallax, and a fourth parallax.

According to an embodiment, in the pixel array (e.g., the pixel array 200 in FIG. 2) of the image sensor 11 having a structure of a quad Bayer pattern or a tetra cell pattern, the structure in which the color separation lens array (e.g., meta prism) is arranged on the pixel array 200 may be referred to as a tetra Q-cell pattern. Accordingly, the input image acquired through the image sensor 11 may be an image signal having a tetra Q-cell pattern. However, the disclosure is not limited thereto, and as such, according to another embodiment, one unit block may be arranged in a matrix form different than a 2×2 matrix, and may include a number of pixels different than four.

According to an embodiment, in operation 403, the method may include separating input image into a plurality of sub-images. For example, the processor 12 may separate or divide the input image into a plurality of sub-images. In an example case, the input image may be divided in a plurality of sub-images of the Bayer pattern including pixels having a same parallax. In this example case, the plurality of sub-images may include a first sub-image having a first parallax, a second sub-image having a second parallax, a third sub-image having a third parallax, and a fourth sub-image having a fourth parallax.

In an example case in which the input image acquired through the image sensor 11 has a tetra Q-cell pattern, the first green (G1) block, the blue (B) block, the red (R) block, and the second green (G2) block may be arranged in the order of the first row and first column, the first row and second column, the second row and first column, and the second row and second column. In this example case, in the first green (G1) block, the blue (B) block, the red (R) block, and the second green (G2) block, four pixels including color filters of a same color are arranged in a 2×2 matrix, and the processor 12 may separate four pixels from each block and merge the pixels arranged in the same row and column in each block.

For example, the processor 12 may separate four pixels from the first green (G1) block, the blue (B) block, the red (R) block, and the second green (G2) block, respectively, and merge multiple pixels arranged in the first row and first column of each block to create a first sub-image having first parallax, merge multiple pixels arranged in the first row and second column of each block to create a second sub-image having second parallax, merge multiple pixels arranged in the second row and first column of each block to create a third sub-image having third parallax, and merge multiple pixels arranged in the second row and second column of each block to create a fourth sub-image having fourth parallax.

In this example case, the first sub-image, the second sub-image, the third sub-image, and the fourth sub-image may be a Bayer pattern arranged in the order of green (G1), blue (B), red (R), and green (G2) in a same color arrangement order as the tetra Q-cell pattern.

According to an embodiment, in operation 405, the method may include converting the plurality of sub-images into a plurality of RGB demosaic images. For example, the processor 12 may convert the plurality of sub-images into a plurality of RGB demosaic images. That is, since each pixel of sub-images having a Bayer pattern has only one value of green (G), blue (B), and red (R), the processor 12 may convert the sub-images into RGB demosaic images through interpolation processing using the values of neighboring pixels so that each pixel of the sub-images may have all RGB values.

According to an embodiment, the processor 12 may generate RGB demosaic images corresponding to each of the sub-images by applying an interpolation algorithm to the plurality of sub-images. For example, the interpolation algorithm applied to the plurality of sub-images may include a residual interpolation (RI) algorithm that performs interpolation in a residual region, a bilinear interpolation algorithm that performs interpolation based on an average value of neighboring pixels, and the like. However, the disclosure is not limited thereto and as such, according to another embodiment, a different algorithm may be applied.

The processor 12 may generate a first RGB demosaic image, a second RGB demosaic image, a third RGB demosaic image, and a fourth RGB demosaic image corresponding to each sub-image for the first sub-image, the second sub-image, the third sub-image, and the fourth sub-image in which the input image is separated for each parallax.

According to an embodiment, in operation 407, the method may include converting the plurality of RGB demosaic images into a plurality of YCbCr images. For example, the processor 12 may convert the plurality of RGB demosaic images into a plurality of YCbCr images. For example, RGB and YCbCr correspond to different types of color spaces. For example, RGB is a color space that designates colors based on the brightness of three channels corresponding to red, green, and blue, and YCbCr is a color space including luminance and color difference components by encoding RGB information.

The processor 12 may generate a first YCbCr image, a second YCbCr image, a third YCbCr image, and a fourth YCbCr image by converting RGB image signals into YCbCr image signals for the first RGB demosaic image, the second RGB demosaic image, the third RGB demosaic image, and the fourth RGB demosaic image, respectively. For example, the processor 12 may generate a plurality of YCbCr images by applying a color space conversion function corresponding to Equation 1 below to the plurality of RGB demosaic images.

$$\begin{bmatrix} Y \\ Cb \\ Cr \end{bmatrix} = \begin{bmatrix} 0.2568 & 0.5041 & 0.0979 \\ -0.1482 & -0.2910 & 0.4392 \\ 0.4392 & -0.3678 & 0.4392 \end{bmatrix} \begin{bmatrix} R \\ G \\ B \end{bmatrix} \quad \text{[Equation 1]}$$

That is, the processor 12 may acquire each Y value, Cb value, and Cr value by applying a color space conversion function corresponding to Equation 1 to each R value, G value, and B value of the plurality of RGB demosaic images, and may generate a plurality of YCbCr images based on the acquired Y value, Cb value, and Cr value. For example, the Y value corresponds to the luminance component, the Cb value corresponds to the difference between the luminance component and the blue component, and the Cr value corresponds to the difference between the luminance component and the red component.

While equation 1 corresponds to an example of a color space conversion function, the disclosure is not limited thereto, and as such, according to another embodiment, an YCbCr image may be generated through various conversion functions.

According to an embodiment, in operation 409, the method may include generating first luminance data based on the plurality of YCbCr images. For example, the processor 12 may generate first luminance data based on luminance data of the plurality of YCbCr images. For example, the processor 12 may generate first luminance data by inputting luminance data among the plurality of YCbCr images to a super resolution algorithm. In this case, the super resolution algorithm may mean an algorithm in a state in which learning is completed through a series of learning processes. For example, the super resolution algorithm may refer to an algorithm in which learning is completed through a series of learning processes in a certain device (e.g., an external device or server) outside the image processing device (e.g., the image processing device 10 in FIG. 1).

For example, after generating a plurality of YCbCr images, the processor 12 may generate luminance data by extracting only the Y value corresponding to the luminance component from the plurality of generated YCbCr images, and input the generated luminance data into the super resolution algorithm.

Since the human eye reacts more sensitively to the luminance component than the chrominance component of the image, the processor 12 may increase the resolution of the image by inputting only data corresponding to the luminance component excluding the chrominance component to the super resolution algorithm. Accordingly, the image processing device (e.g., the image processing device 10 in FIG. 1) may reduce the actual amount of computation by improving only the resolution of the luminance data that may be perceived by humans, thereby increasing efficiency.

According to an embodiment, the processor 12 may generate first luminance data by inputting luminance data extracted from the plurality of YCbCr images to the super resolution algorithm. In this case, the super resolution algorithm may correspond to a generative adversarial networks (GAN) algorithm.

According to an embodiment, the super resolution algorithm may include a generator, a discriminator, and a texture identifier. According to an embodiment, the generator may train a data distribution of a plurality of pieces of luminance data for training, and the discriminator may train to distinguish between the luminance data generated by the generator and the luminance data of the original image. In addition, the texture identifier may be a network in which a data set for a plurality of textures included in an image is trained.

The generative adversarial networks algorithm, which is an example of a super resolution algorithm, aims to be trained so that as generators and discriminators competitively learn, generators may generate fake data similar to the real data. For example, in a case in which the discriminator outputs a value of '0' when deciding that a given data is fake data and a value of '1' when determining that the given data is real data, the generative adversarial networks algorithm may end learning when the discriminator's probability of determining authenticity for a given data converges to a 50% probability.

The generator of the super resolution algorithm may include a shallow feature extraction module, a deep feature extraction module, and a reconstruction module. For example, the shallow feature extraction module may extract features for low-resolution images (e.g., edges, contours, etc.) from luminance data, and the deep feature extraction module may extract features for ultra-high-resolution images from luminance data. In addition, the reconstruction module may generate first luminance data based on features extracted from the shallow feature extraction module and the deep feature extraction module. In this case, the first luminance data may mean data in which information extracted and encoded from the shallow feature extraction module and the deep feature extraction module is decoded and upscaled.

According to an embodiment, the reconstruction module may include a sub-pixel convolution layer. For example, in a case of receiving information in which the first information extracted through the shallow feature extraction module and the second information extracted through the deep feature extraction module is encoded, the reconstruction module may generate first luminance data by decoding and upscaling the received information through the sub-pixel convolution layer. In this case, the first luminance data may have a size of [H×W×1].

According to an embodiment, the texture identifier included in the super resolution algorithm may have a CNN structure in which a data set for a plurality of textures included in the image is learned. In this case, the texture identifier may be in a form in which a dictionary learning method is combined with the CNN structure, and the order-less representation of the data set for the texture may be learned end-to-end. That is, in the case of an image for a texture, since one class does not have its own shape and may have great variability, the texture identifier needs to be a network that is not sensitive to spatial arrangement. Accordingly, the texture identifier may include an order-less feature pooling layer.

According to an embodiment, in operation 411, the method may include generating second luminance data by up-scaling luminance data among the plurality of YCbCr images. For example, the processor 12 may generate second luminance data by up-scaling luminance data among the plurality of YCbCr images. For example, the processor 12 may generate second luminance data with improved image quality compared to the luminance data by performing upscaling on the luminance data. In this case, the upscaling method may be the nearest neighbor method, the bilinear method, the bicubic method, the lanczos method, the spline method, and the artificial intelligence (AI) upscaling method, but is not limited thereto.

According to an embodiment, in operation 413, the method may include generating final luminance data based on the first luminance data and the second luminance data. For example, the processor 12 may generate final luminance data by performing a weighted sum operation on the first luminance data and the second luminance data based on the attention map. In this case, the attention map may mean data including weight values of each of the plurality of labels labeled in the data set for a plurality of textures based on the texture identifier being trained.

In an example case in which 256 labels for a texture are obtained from a data set for a plurality of textures, the attention map may mean data including a weight value of the label for each texture. In addition, the attention map may be referred to as alpha (α).

According to an embodiment, the attention map may be generated by a texture identifier included in the super resolution algorithm. That is, the predetermined image data may include areas of various textures (e.g., walls, land, sky, clothes, skin, etc.), and the texture identifier may generate an attention map by setting a weight value for an area to be more focused among the various textures of the predetermined image data through a series of learning processes.

In an example case in which the image data is input to the texture identifier, the texture identifier may generate an attention map by setting a weight value to a label for each texture included in the input image data.

For example, the texture identifier may generate an attention map by setting a first weight value for a first label for a wall texture, a second weight value for a second label for a land texture, and a third weight value for a third label for a sky texture. In this case, the attention map may have a size of [H×W×1].

According to an embodiment, the attention map may correspond to a weight value through which the discriminator of the super resolution algorithm may select an area to be viewed more intensively in determining whether the data input to the super resolution algorithm is authentic.

According to an embodiment, the processor 12 may generate final luminance data by performing a weighted sum operation on the first luminance data and the second luminance data based on the attention map. In this case, the final luminance data may mean data obtained by combining first luminance data generated by luminance data passing through a super resolution algorithm with second luminance data obtained by simply upscaling the luminance data according to the attention map.

In particular, the ratio of the first luminance data and the second luminance data to be combined with each other may vary according to the attention map, and as the attention map is applied, there is an effect of minimizing distortion that may be caused by a super resolution algorithm compared to processing only the first luminance data. A detailed description thereof will be described later in FIG. 9.

According to an embodiment, in operation 415, the method may include acquiring a plurality of final YCbCr images by updating the luminance data of the plurality of YCbCr images based on the final luminance data. For example, the processor 12 may acquire a plurality of final YCbCr images by updating the luminance data of the plurality of YCbCr images based on the final luminance data.

For example, the processor 12 may input only the Y value (luminance component) extracted from among a plurality of existing YCbCr images to the super resolution algorithm, and determine the Y value output from the super resolution algorithm as the final luminance data. Thereafter, the processor 12 may acquire a plurality of final YCbCr images by updating (or changing) a Y value corresponding to luminance data among the plurality of existing YCbCr images to a Y value corresponding to the final luminance data.

According to an embodiment, in operation 417, the method may include generating a final output image based on the plurality of final YCbCr images. For example, the processor 12 may generate the final output image by merging the plurality of final sub-images generated based on the plurality of final YCbCr images.

In an example case in which an image signal with a tetra Q-cell pattern is input, four sub-images separated by parallax may be converted into a plurality of final YCbCr images through a series of processes (e.g., RGB demosaic processing, YCbCr processing, and super resolution processing for Y values (luminance data).

Thereafter, the processor 12 may generate a final output image by converting a plurality of final YCbCr images into RGB images and then inputting the converted RGB images into a Bayer sampling block to generate and merge a plurality of final sub-images of the Bayer pattern.

FIG. 5 illustrates a plan view of a color separation lens array included in a pixel array of an image sensor according to an embodiment.

Referring to FIG. 5, the color separation lens array 130 may include a plurality of pixel-corresponding regions. The color separation lens array 130 may include a plurality of pixel-corresponding groups 130G that may respectively correspond to the plurality of unit pixel groups 110G of the sensor substrate 110 of FIG. 3.

According to an embodiment, the pixel-corresponding group 130G may include a first pixel-corresponding region 131, a second pixel-corresponding region 132, a third pixel-corresponding region 133, and a fourth pixel-corresponding region 134 corresponding to the unit blocks (e.g., the first green (G1) block, the blue (B) block, the red (R) block, and the second green (G2) block of FIG. 3), respectively, of the unit pixel group 110G. Each of the first pixel-corresponding region 131, the second pixel-corresponding region 132, the third pixel-corresponding region 133, and the fourth pixel-corresponding region 134 may include a plurality of nano-posts (not shown). The plurality of nano-posts may be configured to separate incident light according to wavelengths and condense the light on a corresponding unit block for each wavelength.

Figure 6A:
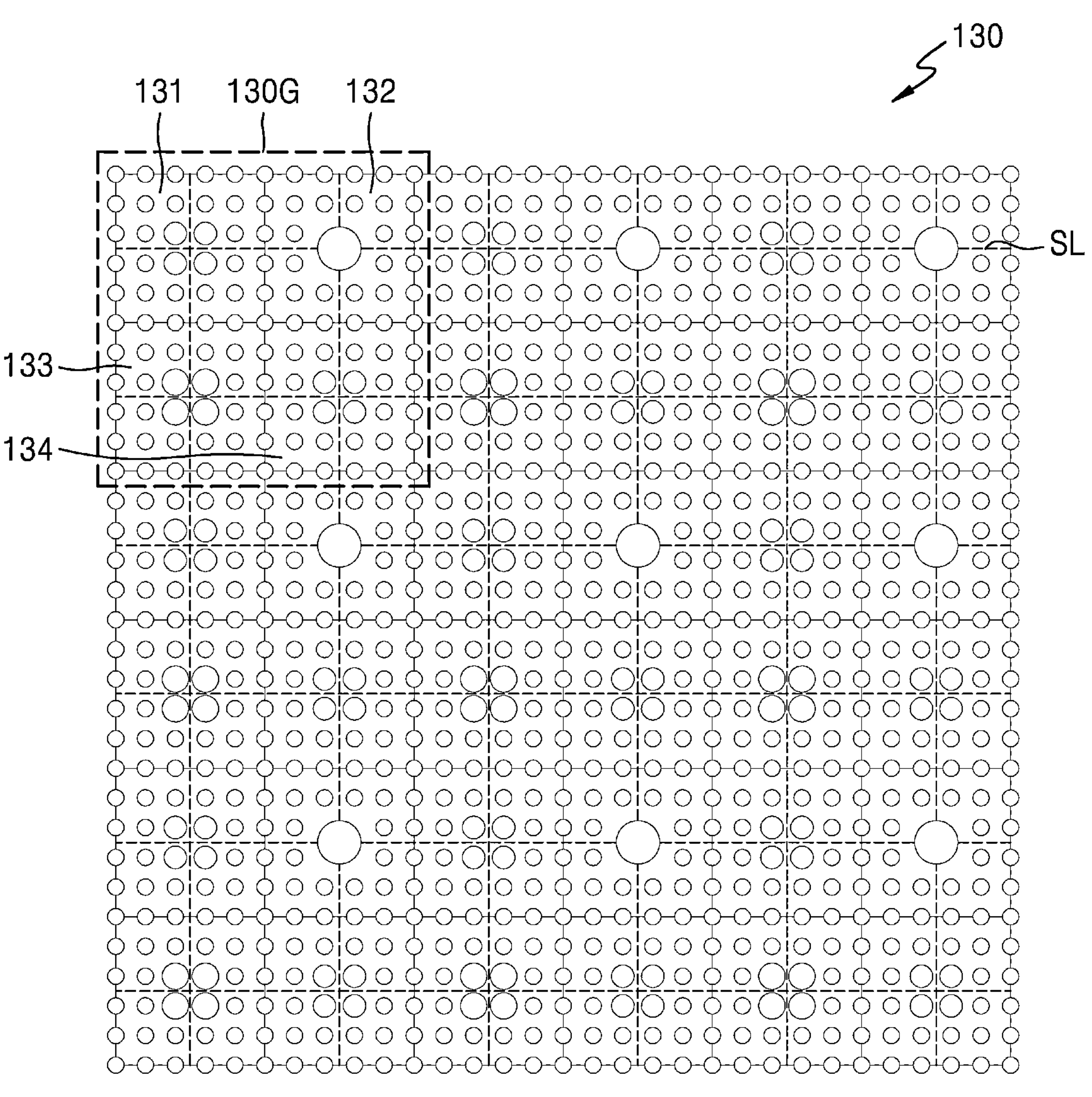
FIG. 6A is a plan view illustrating an arrangement shape of nano-posts provided in a pixel-corresponding region of a color separation lens array according to an embodiment.

FIG. 6A is a plan view illustrating an arrangement shape of nano-posts provided in a pixel-corresponding region of a color separation lens array according to an embodiment.

Referring to FIG. 6A, the pixel-corresponding group 130G may include a plurality of cylindrical nano-posts having a circular cross-section. For example, the first pixel-corresponding region 131 may include a plurality of first nano-posts, the second pixel-corresponding region 132 may include a plurality of second nano-posts, the third pixel-corresponding region 133 may include a plurality of third nano-posts, and the fourth pixel-corresponding region 134 may include a plurality of fourth nano-posts. In this case, the nano-post located at the boundary between the adjacent pixel-corresponding regions, for example, the nano-post located at the boundary between the first pixel-corresponding region 131 and the second pixel-corresponding region 132, may be arbitrarily referred to as a first nano-post or a second nano-post. In addition, a nano-post located at the boundary between the first pixel-corresponding region 131 and the third pixel-corresponding region 133 may be arbitrarily referred to as a first nano-post or a third nano-post.

In an embodiment, the cross-shaped separation line SL displayed in the first pixel-corresponding region 131, the second pixel-corresponding region 132, the third pixel-corresponding region 133, and the fourth pixel-corresponding region 134 is the center line of the isolation structure provided in the unit pixel group 110G of the pixel array (e.g., the pixel array 200 of FIG. 2) facing each of the pixel-corresponding regions 131, 132, 133, and 134 and for the convenience of explanation, the cross-shaped separation line SL is displayed together by overlapping the pixel-corresponding regions 131, 132, 133, and 134.

According to an embodiment, nano-posts each having a larger cross-sectional area than peripheral portions may be arranged in the centers of the first pixel-corresponding region 131, the second pixel-corresponding region 132, the third pixel-corresponding region 133, and the fourth pixel-corresponding region 134. For example, the first central nano-post having the largest cross-sectional width among the plurality of first nano-posts may be arranged in the center of the first pixel-corresponding region 131. The second central nano-post having the largest cross-sectional width among the plurality of second nano-posts may be arranged in the center of the second pixel-corresponding region 132. The third central nano-post having the largest cross-sectional width among the plurality of third nano-posts may be arranged in the center of the third pixel-corresponding region 133. The fourth central nano-post having the largest cross-sectional width among the plurality of fourth nano-posts may be arranged in the center of the fourth pixel-corresponding region 134.

According to an embodiment, the number of central nano-posts arranged in the centers of the first pixel-corresponding region 131, the second pixel-corresponding region 132, the third pixel-corresponding region 133, and the fourth pixel-corresponding region 134 may be different from each other.

For example, there may be one second central nano-post arranged in the center of the second pixel-corresponding region 132, and there may be a plurality of first central nano-posts, third central nano-posts, and fourth central nano-posts (e.g., four) arranged in the centers of the first pixel-corresponding region 131, the third pixel-corresponding region 133, and the fourth pixel-corresponding region 134, respectively.

In addition, the second central nano-post arranged at the center of the second pixel-corresponding region 132 may be arranged to overlap the center of the separation line SL, and the first central nano-posts, the third central nano-posts, and the fourth central nano-posts arranged at the centers of the first pixel-corresponding region 131, the third pixel-corresponding region 133, and the fourth pixel-corresponding region 134, respectively, may be arranged not to overlap the center of the separation line SL as the nano-posts are spaced apart from the center of the separation line SL.

According to an embodiment, magnitudes of cross-sectional areas of the central nano-posts arranged in each pixel-corresponding region may be different from each other. For example, among the unit blocks of the pixel array 200, the cross-sectional area of the central nano-post arranged in the second pixel-corresponding region 132 corresponding to the blue (B) block may be the largest, and the cross-sectional areas of the central nano-posts arranged in the first pixel-corresponding region 131 and the fourth pixel-corresponding region 134 corresponding to the green (G1 and G2) blocks may be the smallest.

Figure 6B:
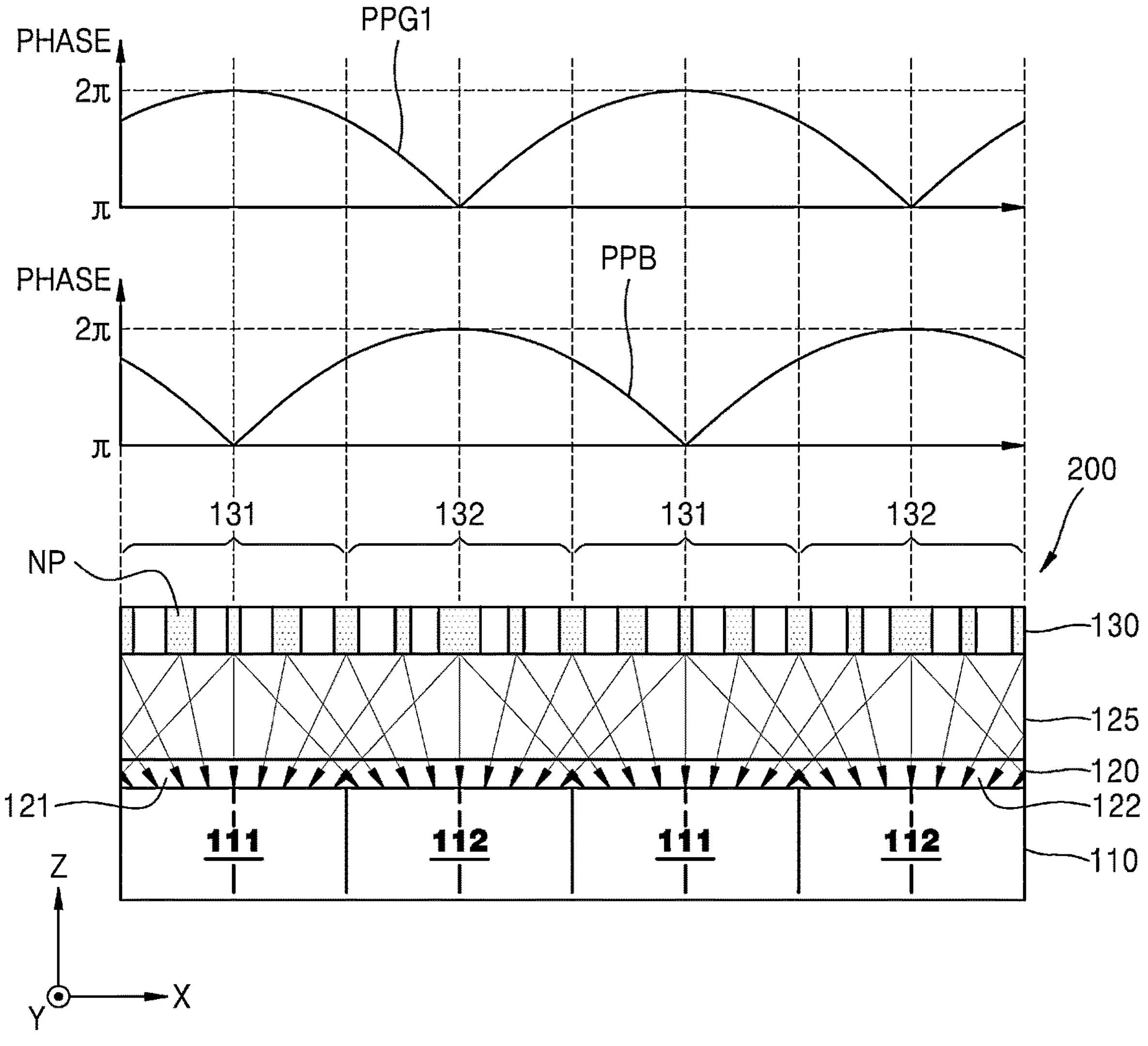
FIG. 6B illustrates an example diagram of a phase distribution of blue light and green light passing through the color separation lens array illustrated in FIG. 6A.

FIG. 6B illustrates an example diagram of a phase distribution of green light and blue light passing through the color separation lens array illustrated in FIG. 6A.

Referring to FIG. 6B, the green light passing through the color separation lens array 130 may have a first green light phase distribution PPG1 in which a first green light phase is the largest at the center of the first pixel-corresponding region 131, and decreases in a direction away from the center of the first pixel-corresponding region 131. Specifically, the position right after passing through the color separation lens array 130, that is, the phase of the green light on the lower surface of the color separation lens array 130, may be largest at the center of the first pixel-correspondence area 131 and may gradually decrease in a concentric shape as the distance from the center of the first pixel-corresponding area 131 increases.

In addition, the blue light passing through the color separation lens array 130 may have a blue light phase distribution PPB in which a blue light phase is the largest in the center of the second pixel-corresponding region 132, and decreases in the direction away from the center of the second pixel-corresponding region 132. Specifically, the position immediately after passing through the color separation lens array 130, that is, the phase of blue light on the lower surface of the color separation lens array 130, may be the largest at the center of the second pixel-corresponding region 132, and may gradually decrease in a concentric circle as the distance from the center of the second pixel-corresponding region 132 increases.

Then, among incident light incident on the first pixel-corresponding region 131 and incident light incident on a portion of the second pixel-corresponding region 132 and a portion of the third pixel-corresponding region 133 around the first pixel-corresponding region 131, green light may be condensed into the first pixel 111 by the color separation lens array 130. In addition, among incident light incident on the second pixel-corresponding area 132, and incident light incident on a portion of the first pixel-corresponding area 131, a portion of the third pixel-corresponding area 133, and a portion of the fourth pixel-corresponding area 134, blue light may be condensed into the second pixel 112 by the color separation lens array 130.

Figure 6C:
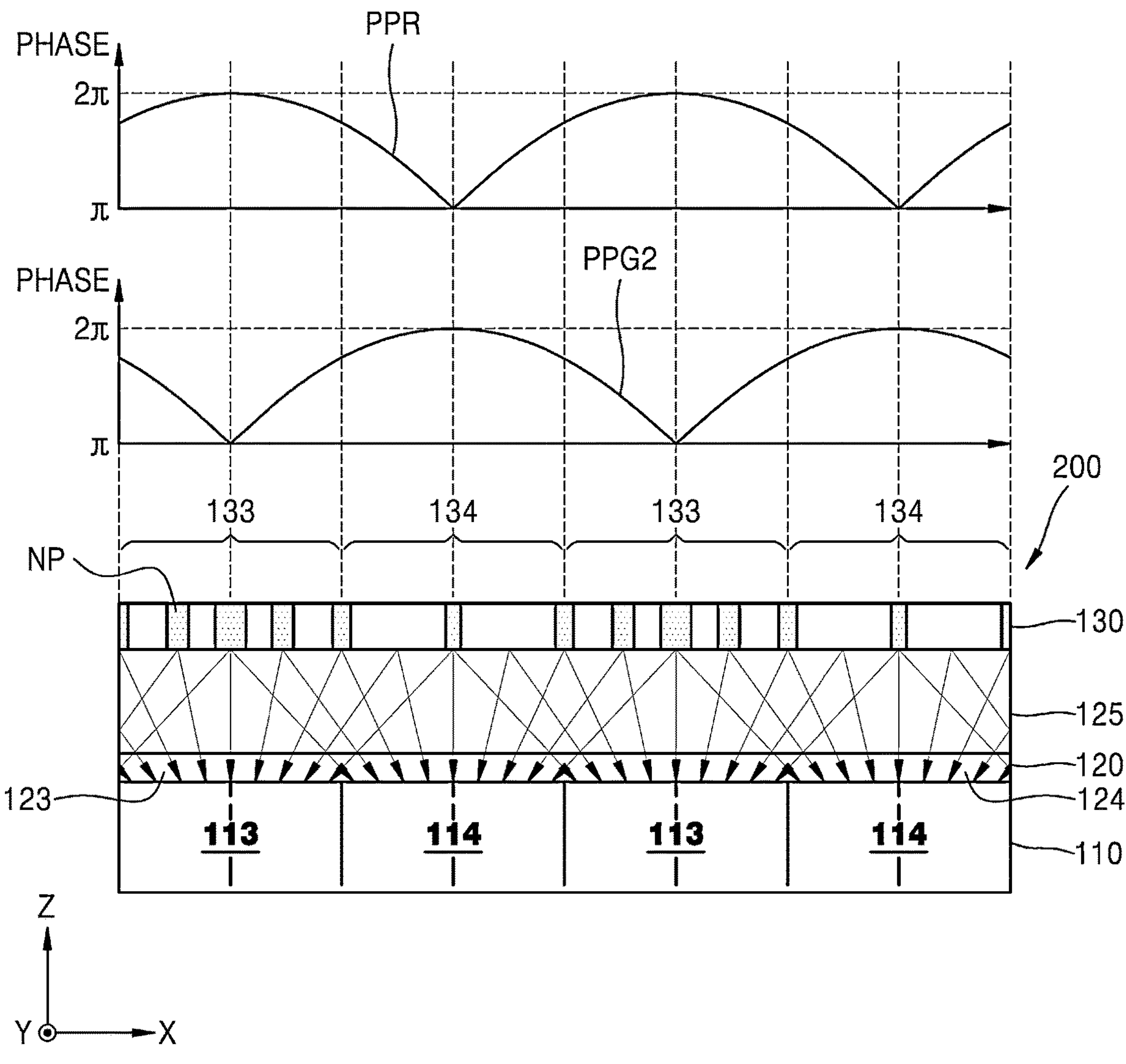
FIG. 6C illustrates an example diagram of a phase distribution of red light and green light passing through the color separation lens array illustrated in FIG. 6A.

FIG. 6C illustrates an example diagram of a phase distribution of red light and green light passing through the color separation lens array illustrated in FIG. 6A.

Referring to FIG. 6C, the red light passing through the color separation lens array 130 may have a red light phase distribution PPR in which a red light phase is the largest at the center of the third pixel-corresponding region 133, and decreases in a direction away from the center of the third pixel-corresponding region 133. Specifically, the position right after passing through the color separation lens array 130, that is, the phase of the red light on the lower surface of the color separation lens array 130, may be largest at the center of the third pixel-correspondence area 133 and may gradually decrease in a concentric shape as the distance from the center of the third pixel-corresponding area 133 increases.

In addition, the green light passing through the color separation lens array 130 may have a second green light phase distribution PPG2 in which a second green light phase is the largest in the center of the fourth pixel-corresponding region 134, and decreases in the direction away from the center of the fourth pixel-corresponding region 134. Specifically, the position right after passing through the color separation lens array 130, that is, the phase of the green light on the lower surface of the color separation lens array 130, may be largest at the center of the fourth pixel-correspondence area 134 and may gradually decrease in a concentric shape as the distance from the center of the fourth pixel-corresponding area 134 increases.

Then, among incident light incident on the third pixel-corresponding area 133, and incident light incident on a portion of the first pixel-corresponding area 131, a portion of the second pixel-corresponding area 132, and a portion of the fourth pixel-corresponding area 134, around the third pixel-corresponding area 133, red light may be condensed into the third pixel 113 by the color separation lens array 130. In addition, among incident light incident on the fourth pixel-corresponding region 134 and incident light incident on a portion of the second pixel-corresponding region 132 and a portion of the third pixel-corresponding region 133 around the fourth pixel-corresponding region 134, green light may be condensed into the fourth pixel 114 by the color separation lens array 130.

FIG. 7 is a plan view illustrating an input image of a tetra Q cell pattern input through a color separation lens array according to an embodiment.

Referring to FIG. 7, an input image 700 may be obtained through an image sensor (e.g., the image sensor 11 of FIG. 2) that includes a color separation lens array in the form of a meta prism (MP). For example, the input image 700 may be an image signal having a tetra Q-cell pattern obtained through the image sensor 11.

According to an embodiment, the input image 700 may include a unit image 700G corresponding to each of a plurality of pixel-corresponding groups (e.g., the pixel-corresponding group 130G of FIG. 5) of the color separation lens array (e.g., the color separation lens array 130 of FIG. 5). In this case, the unit image 700G may have one quad Bayer pattern including 16 pixels arranged in a 4×4 matrix. For example, the unit image 700G may include 16 pixels corresponding to four unit blocks, and may include four pixels g11, g12, g21, and g22 corresponding to the first green (G1) block, four pixels b13, b14, b23, b24 corresponding to the blue (B) block, four pixels r31, r32, 41, and r42 corresponding to the red (R) block, and four pixels g33, g34, g43, and g44 corresponding to the second green (G2) block.

According to an embodiment, four pixels included in one unit block of the unit image 700G may have different parallaxes.

For example, the four pixels g11, g12, g21, and g22 corresponding to the first green (G1) block may include a first pixel g11 having a first parallax, a second pixel g12 having a second parallax, a third pixel g21 having a third parallax, and a fourth pixel g22 having a fourth parallax, respectively. In addition, the four pixels b13, b14, b23, and b24 corresponding to the blue (B) block may include a first pixel b13 having a first parallax, a second pixel b14 having a second parallax, a third pixel b23 having a third parallax, and a fourth pixel b24 having a fourth parallax, respectively. In addition, the four pixels r31, r32, r41, and r42 corresponding to the red (R) block may include a first pixel r31 having a first parallax, a second pixel r32 having a second parallax, a third pixel r41 having a third parallax, and a fourth pixel r42 having a fourth parallax, respectively. In addition, the four pixels g33, g34, g43, and g44 corresponding to the second green (G2) block may include a first pixel g33 having a first parallax, a second pixel g34 having a second parallax, a third pixel g43 having a third parallax, and a fourth pixel g44 having a fourth having a third parallax, respectively.

FIGS. 8A-8D are plan views illustrating a plurality of sub images of a Bayer pattern in which the input image of FIG. 7 is separated.

Referring to FIGS. 8A-8D, a processor (e.g., the processor 12 in FIG. 1) may divide an input image (e.g., input image 700 in FIG. 7) into multiple sub-images 800A, 800B, 800C, and 800D of a Bayer pattern including pixels with a same parallax. For example, the plurality of sub-images may include a first sub-image 800A (as shown in FIG. 8A) having a first parallax, a second sub-image 800B (as shown in FIG. 8B) having a second parallax, a third sub-image 800C (as shown in FIG. 8C) having a third parallax, and a fourth sub-image 800D (as shown in FIG. 8D) having a fourth parallax.

According to an embodiment, the processor 12 may separate pixels having a same parallax based on the unit image (e.g., the unit image 700G of FIG. 7) of the input image 700. For example, the unit image 700G including 16 pixels may include a first unit image 801G including four first pixels g11, b13, r31, and g33 having a first parallax, a second unit image 802G including four second pixels g12, b14, 132, and g34 having a second parallax, a third unit image 803G including four third pixels g21, b23, r41, and g43 having a third parallax, and a fourth unit image 804G including four fourth pixels g22, b24, r42, and g44 having a fourth parallax.

According to an embodiment, each of the plurality of sub-images may include a plurality of unit images. For example, in the same manner as the method of separating the unit image 700G of the input image 700 into the first unit image 801G, the second unit image 802G, the third unit image 803G, and the fourth unit image 804G, the processor 12 may generate a plurality of first unit images, second unit images, third unit images, and fourth unit images by separating different unit images of the input image 700 into pixels having a same parallax.

Figure 9:
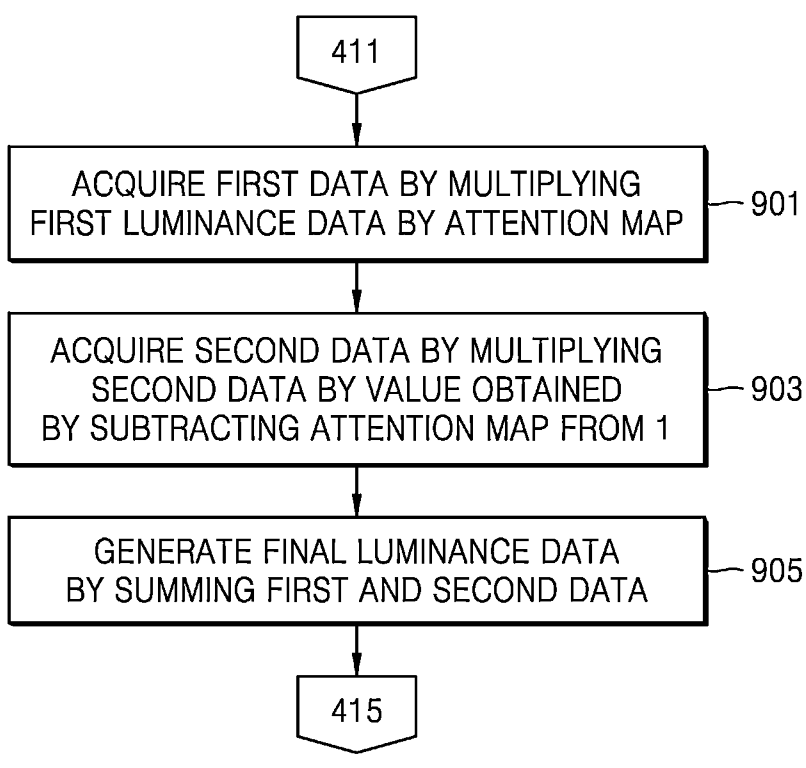
FIG. 9 is a flowchart illustrating an image processing device generating final luminance data according to an embodiment.

FIG. 9 is a flowchart illustrating an image processing device generating final luminance data according to an embodiment. FIG. 9 relates to operation 413 of FIG. 4, and descriptions corresponding to, the same as, or similar to, the above description may be omitted.

Referring to FIG. 9, in operation 901, the method may include acquiring first data by multiplying the first luminance data by an attention map $\alpha$. For example, a processor (e.g., the processor 12 of FIG. 1) may obtain first data by multiplying the first luminance data by an attention map $\alpha$. In this example case, the first luminance data may mean data in which information extracted and encoded from the shallow feature extraction module and the deep feature extraction module is decoded and upscaled.

According to an embodiment, the attention map may mean data including weight values of each of the plurality of labels labeled in the data set for a plurality of textures based on the texture identifier being trained, and the weight value may be less than 1.

According to an embodiment, in operation 903, the method may include obtaining second data by multiplying the second luminance data by a value obtained by subtracting the attention map from 1. For example, the processor 12 may obtain second data by multiplying the second luminance data by a value obtained by subtracting the attention map from 1. In this example case, the second luminance data may mean data with improved image quality by performing upscaling on the luminance data.

According to an embodiment, the processor 12 may acquire the first data and the second data based on the attention map including different weight values according to the characteristics of each region of the luminance data.

In an example case in which it is necessary to apply a larger weight value to a feature extracted through the generator of a super resolution algorithm than the original data with respect to a first region of the luminance data regions, the processor 12 may acquire the first data based on the attention map $\alpha$ that includes a weight value exceeding 0.5 for the first luminance data of the first region, and acquire the second data based on the value obtained by subtracting the weight value from 1 for the second luminance data of the first region.

In another example case in which it is necessary to apply a larger weight value to the original data than the feature extracted through the generator of the super resolution algorithm with respect to a second region of the luminance data regions, the processor 12 may acquire the first data based on the attention map $\alpha$ including a weight value less than 0.5 for the first luminance data of the second region, and acquire the second data based on a value obtained by subtracting the weight value from 1 for the second luminance data of the second region.

According to an embodiment, in operation 905, the method may include generating final luminance data by performing a sum operation on the first data and the second data. For example, the processor 12 may generate the final luminance data by performing a sum operation on the first data and the second data.

Figure 10:
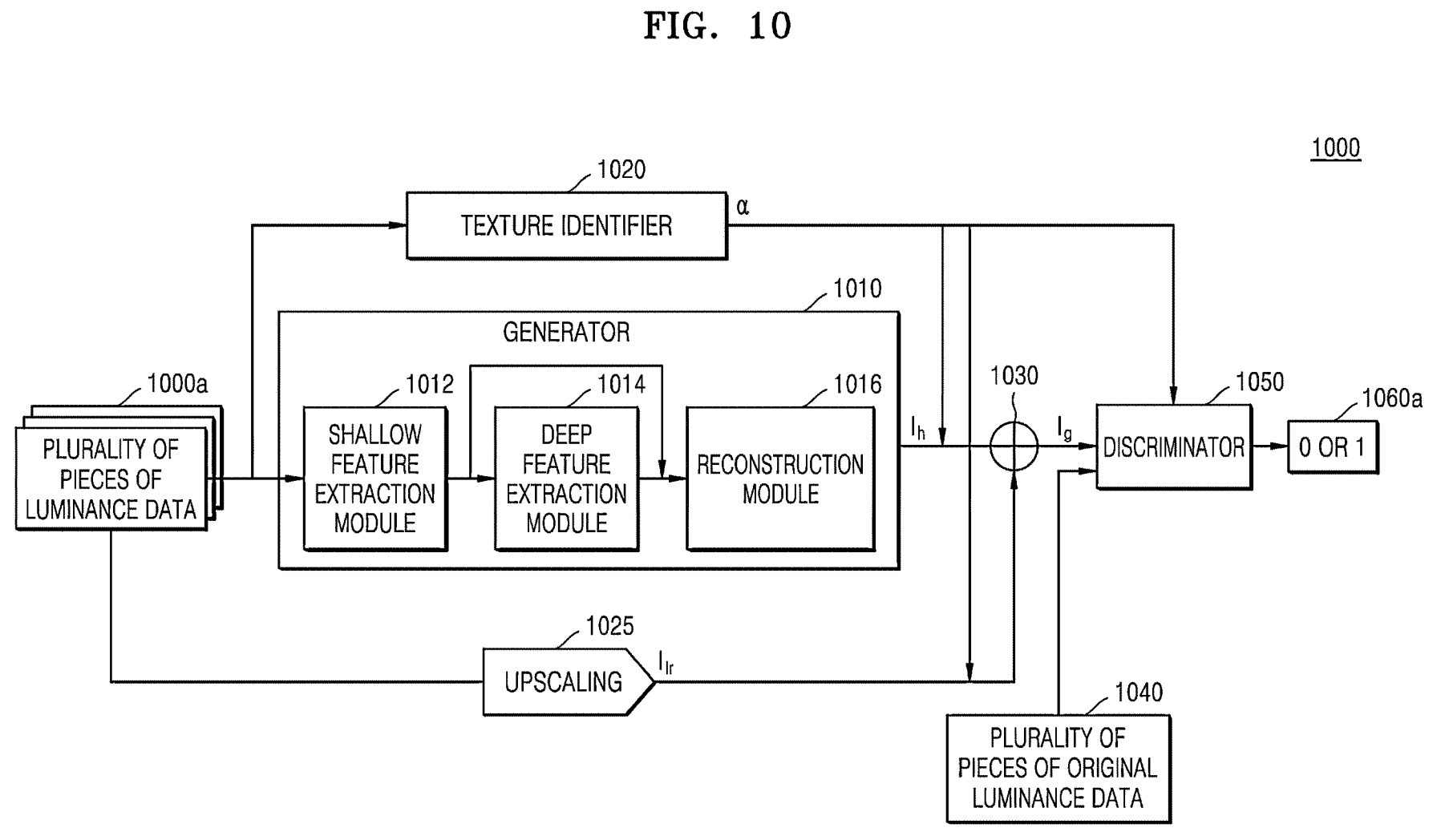

FIG. 10 illustrates a block diagram illustrating a method of learning a super resolution algorithm according to an embodiment.

Referring to FIG. 10, the super resolution algorithm 1000 may include a generator 1010, a discriminator 1050, and a texture identifier 1020. According to an embodiment, the generator 1010 may learn a data distribution of a plurality of pieces of luminance data 1000*a* for learning, and the discriminator 1050 may learn to distinguish between the luminance data generated by the generator 1010 and the luminance data of the original image. In addition, the texture identifier 1020 may generate an attention map $\alpha$ to a network in which a data set for a plurality of textures included in the image is learned.

According to an embodiment, the super resolution algorithm 1000 may correspond to a generative adversarial networks (GAN) algorithm. Therefore, the discriminator 1050 may learn in a direction in which the discriminator 1050 may better distinguish between the data generated through the generator 1010 and the original data, and the generator 1010 may learn in a direction in which the discriminator 1050 may generate data that may determine as the original data.

According to an embodiment, as a plurality of pieces of luminance data 1000*a* for learning are input to the super resolution algorithm 1000, the generator 1010 and the discriminator 1050 may be trained. In this case, the plurality of pieces of luminance data 1000*a* for learning may be converted into a plurality of pieces of first luminance data $I_h$ through the generator 1010, and may be converted into a plurality of pieces of second luminance data $I_{r'}$ through the upscaling 1025.

According to an embodiment, the plurality of pieces of luminance data 1000*a* for learning may be input to the generator 1010, and the generator 1010 may extract features from the plurality of pieces of luminance data 1000*a* for learning through a shallow feature extraction module 1012 and a deep feature extraction module 1014. For example, the generator 1010 may extract features for a low-resolution image from the plurality of pieces of luminance data 1000*a* for learning through the shallow feature extraction module 1012. In addition, the generator 1010 may extract features for an ultra-high-resolution image from a plurality of pieces of luminance data 1000*a* for learning through the deep feature extraction module 1014.

According to an embodiment, the generator 1010 may generate a plurality of pieces of first luminance data $I_h$ based on features extracted from the shallow feature extraction module 1012 and the deep feature extraction module 1014 through the reconstruction module 1016. In this case, the plurality of pieces of first luminance data $I_h$ may mean data in which information extracted and encoded from the shallow feature extraction module 1012 and the deep feature extraction module 1014 is decoded and upscaled, and may have a size of [H×W×1].

According to an embodiment, the texture identifier 1020 may generate an attention map that is each weight value for a plurality of labels labeled in a data set for a plurality of textures. For example, the texture identifier 1020 trained through the data set for the plurality of textures may generate an attention map by setting values for labeling and weighting for textures in a region to be more focused among various textures of image data.

According to an embodiment, the super resolution algorithm 1000 may acquire luminance data calculated by performing a weighted sum operation on the plurality of pieces of first luminance data $I_h$ generated through the generator 1010 and the plurality of pieces of second luminance data $I_{lr}$ generated by the upscaling 1025 based on the attention map $\alpha$.

For example, the super resolution algorithm 1000 may include a calculation unit 1030 that performs a weighted sum operation based on the attention map $\alpha$, and the calculation unit 1030 may acquire a plurality of pieces of first data by multiplying, by the attention map $\alpha$, a plurality of first luminance data $I_h$ generated through the generator 1010, and may acquire a plurality of pieces of second data by multiplying the plurality of pieces of second luminance data $I_{lr}$ generated through the upscaling 1025 by a value obtained by subtracting the attention map $\alpha$ from 1 (i.e., 1-$\alpha$). In addition, the calculation unit 1030 may generate a plurality of pieces of final luminance data $I_g$ by performing a sum operation on corresponding data for the plurality of pieces of first data and the plurality of pieces of second data.

In an example case in which the plurality of pieces of first data and the plurality of pieces of second data are merged, the calculation unit 1030 may generate a plurality of pieces of final luminance data by reflecting a ratio according to a weight value of the attention map $\alpha$. As the learning of the generator 1010 of the super resolution algorithm 1000 proceeds, the plurality of pieces of generated final luminance data $I_g$ may be generated substantially the same as and/or similar to the plurality of pieces of original luminance data 1040.

According to an embodiment, the discriminator 1050 may distinguish the plurality of pieces of final luminance data $I_g$ from the plurality of pieces of original luminance data 1040 and may output a result value 1060*a* as a binary value. For example, the discriminator 1050 may output a value of 1 as the result value 1060*a* based on a determination that the plurality of pieces of final luminance data $I_g$ is real, and output a value of 0 value as the result value 1060*a* when based on a determination that the plurality of pieces of final luminance data $I_g$ is fake.

In an example case in which the probability of determining the authenticity of the discriminator 1050 for the data generated through the generator 1010 converges to a probability of about 50%, the learning of the super resolution algorithm 1000 may be terminated. In an example case in which the probability of getting to the correct answer as the discriminator 1050 determines that the plurality of pieces of final luminance data $I_g$ are fake, and the probability of getting to the wrong answer as the discriminator 1050 determines that the plurality of pieces of final luminance data $I_g$ are real, are converged to about 50% and about 50%, respectively, the super resolution algorithm 1000 may be terminated without additional learning.

FIG. 11 illustrates a block diagram illustrating a method of obtaining final luminance data by applying luminance data to a super resolution algorithm. In this case, the super resolution algorithm 1100 may correspond to the super resolution algorithm 1000 in FIG. 10 in a state in which the learning is terminated. In addition, in the description with reference to FIG. 11, a description corresponding to, the same as, or similar to, the above description may be omitted.

Referring to FIG. 11, the super resolution algorithm 1100 may include a generator 1010 and a texture identifier 1020, and the discriminator 1050 compared to the super resolution algorithm 1000 may be omitted.

According to an embodiment, as the luminance data 1000*b* is input to the super resolution algorithm 1100, the luminance data 1000*b* may be converted into first luminance data $I_h$ through the generator 1010, and may be converted into second luminance data $I_{lr}$ through the upscaling 1025. According to an embodiment, the luminance data 1000*b* may be data on the luminance component Y acquired through a series of processes (e.g., image separation by parallax, RGB demosaic processing, and YCbCr processing) for the input image acquired through the image sensor (e.g., the image sensor 11 of FIG. 1).

According to an embodiment, the super resolution algorithm 1100 may acquire final luminance data 1060*b* calculated by performing a weighted sum operation on the first luminance data $I_h$ generated through the generator 1010 and the second luminance data $I_{lr}$ generated by the upscaling 1025 based on the attention map $\alpha$.

For example, the super resolution algorithm 1100 may include a calculation unit 1030 that performs a weighted sum operation based on the attention map $\alpha$, and the calculation unit 1030 may acquire first data by multiplying, by the attention map $\alpha$, first luminance data $I_h$ generated through the generator 1010, and may acquire second data by multiplying the second luminance data $I_{lr}$ generated through the upscaling 1025 by a value obtained by subtracting the attention map $\alpha$ from 1 (i.e., 1-$\alpha$). In addition, the calculation unit 1030 may generate final luminance data 1060*b* by performing a sum operation on the first data and the second data.

Figure 12:
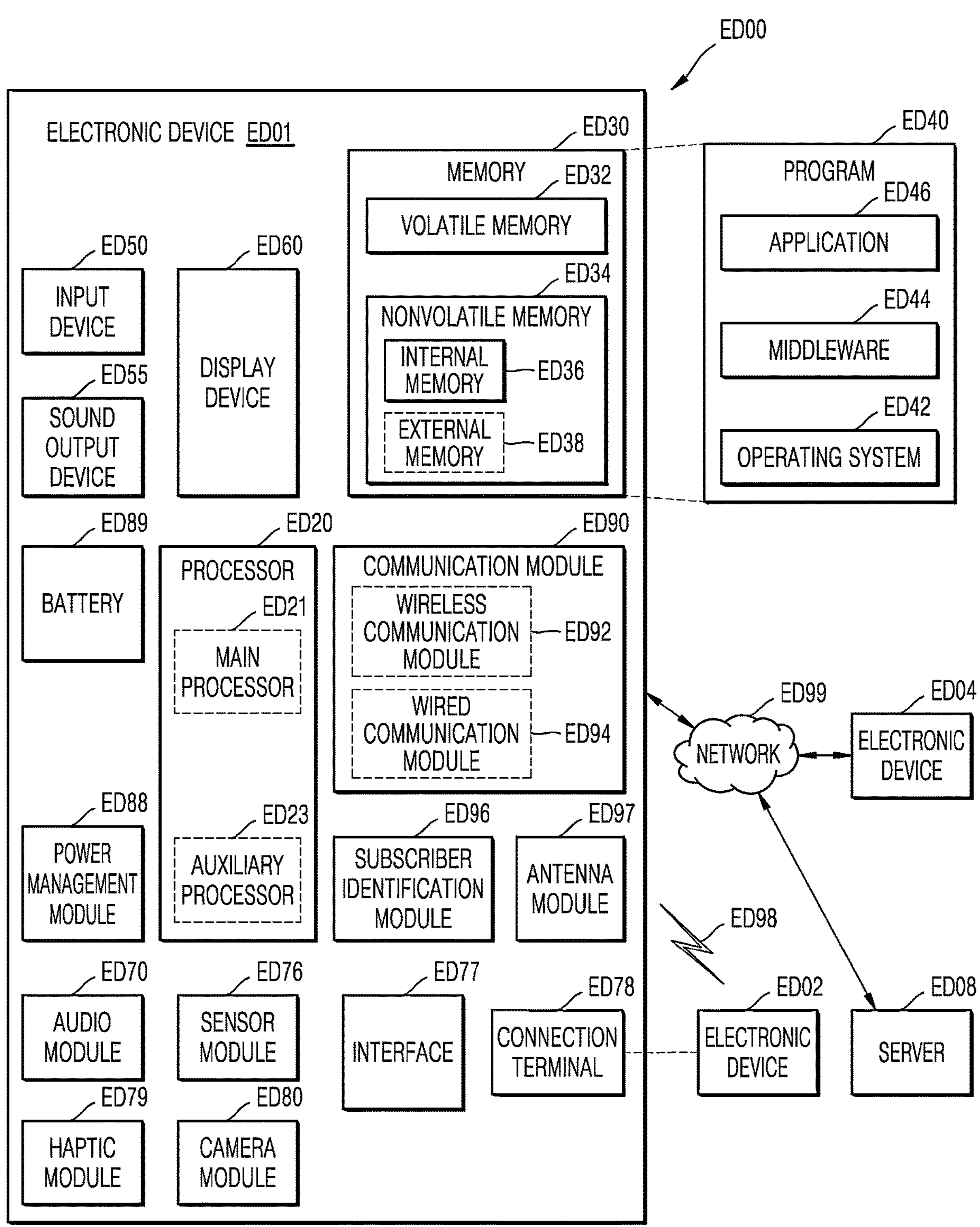
FIG. 12 is a block diagram schematically illustrating an electronic device including an image sensor according to embodiments.

FIG. 12 is a block diagram schematically illustrating an electronic device including an image sensor according to embodiments.

Referring to FIG. 12, in a network environment ED00, an electronic device ED01 may communicate with another electronic device ED02 through a first network ED98 (a short-range wireless communication network or the like), or with another electronic device 2204 and/or a server ED08 through a second network ED99 (a long-range wireless communication network or the like). The electronic apparatus ED01 may communicate with the electronic apparatus 8204 through the server ED08. The electronic apparatus ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (such as the display device ED60) of these components may be omitted from or other components may be added to the electronic device ED01. Some of these components may be implemented as one integrated circuit. For example, the sensor module ED76 (fingerprint sensor, iris sensor, illumination sensor, etc.) may be implemented by being embedded in the display device ED60 (display, etc.).

The processor ED20 may execute software (program ED40 or the like) to control one or a plurality of other components (hardware and software components, or the like) of the electronic device ED01 connected to the processor ED20, and may perform processing or operations of various data. As part of data processing or operation, the processor ED20 may load commands and/or data received from other components (sensor modules ED76, communication modules (ED90, etc.), process commands and/or data stored in volatile memory ED32, and store the result data in nonvolatile memory ED34. The processor ED20 may include a main processor ED21 (a central processing unit, an application processor, etc.) and an auxiliary processor ED23 (a graphics processing unit, an image signal processor, a sensor hub processor, a communication processor, etc.) that may be operated independently of or together with the main processor ED21. The auxiliary processor ED23 may use less power than the main processor ED21 and perform a specialized function.

The auxiliary processor ED23 may control functions and/or states related to some (the display device ED60, sensor module ED10, communication module ED90, etc.) of the components of the electronic apparatus ED01, in place of the main processor ED21 while the main processor ED21 is in an inactive state (slip state), or together with the main processor ED21 while the main processor ED21 is in an active state (application execution state). The auxiliary processor ED23 (image signal processor, communication processor, etc.) may be implemented as part of other functionally related components (camera module 8280, communication module 8290, etc.).

The memory ED30 may store various data required by components (processor ED20 and sensor module ED76) of the electronic apparatus ED01. The data may include, for example, input data and/or output data for software (program ED40 or the like) and related commands. The memory ED30 may include a volatile memory ED32 and/or a non-volatile memory ED34.

The program ED40 may be stored in the memory ED30 as software, and may include an operating system ED42, middleware ED44, and/or an application ED46.

The input device ED50 may receive commands and/or data to be used in components (processor ED20, etc.) of the electronic apparatus ED01 from the outside (user, etc.) of the electronic apparatus ED01. The input device ED50 may include a microphone, a mouse, a keyboard, and/or a digital pen (such as a stylus pen, etc.).

The sound output device ED55 may output the sound signal to the outside of the electronic apparatus ED01. The sound output device ED55 may include a speaker and/or a receiver. Speakers may be used for general purposes such as multimedia playback or recording playback, and receivers may be used to receive incoming calls. The receiver may be coupled as part of a speaker or may be implemented as an independent separate device.

The display device ED60 may visually provide information to the outside of the electronic device ED01. The display device ED60 may include a display, a hologram device, or a projector and a control circuit for controlling the corresponding devices. The display device ED60 may include a touch circuitry configured to sense a touch, and/or a sensor circuit (a pressure sensor, etc.) configured to measure an intensity of a force generated by the touch.

The audio module ED70 may convert sound into an electrical signal or conversely convert the electrical signal into sound. The audio module ED70 may acquire sound through the input device ED50 or output sound through the sound output device ED55 and/or a speaker and/or a headphone of another electronic apparatus (e.g., electronic apparatus ED02, etc.) directly or wirelessly connected to the electronic apparatus ED01.

The sensor module ED76 may detect an operating state (power, temperature, etc.) or an external environmental state (user state, etc.) of the electronic apparatus ED01 and generate an electrical signal and/or a data value corresponding to the sensed state. The sensor module ED76 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illumination sensor.

The interface ED77 may support one or more designated protocols that may be used for electronic apparatus ED01 to be directly or wirelessly connected to another electronic apparatus (e.g., electronic apparatus ED02, etc.). The interface ED77 may include a high definition multimedia interface (HDMI), a universal serial bus (USB) interface, an SD card interface, and/or an audio interface.

The connection terminal ED78 may include a connector through which the electronic apparatus ED01 may be physically connected to another electronic apparatus (e.g., electronic apparatus ED02, etc.). The connection terminal ED78 may include an HDMI connector, a USB connector, an SD card connector, and/or an audio connector (such as a headphone connector, etc.).

The haptic module ED79 may convert an electrical signal to a mechanical stimulus (vibration, motion, etc.) or an electrical stimulus that a user can recognize through a tactile or motion sensation. The haptic module ED79 may include a motor, a piezoelectric element, and/or an electrical stimulus.

The camera module ED80 may capture a still image and a moving image. The camera module ED80 may include a lens assembly including one or more lenses, image sensors 1000, image signal processors, and/or flashes. The lens assembly included in the camera module ED80 may condense light emitted from an object to be photographed.

The power management module ED88 may manage power supplied to the electronic apparatus ED01. The power management module ED88 may be implemented as part of a power management integrated circuit (PMIC).

The battery ED89 may supply power to components of the electronic apparatus ED01. The battery ED89 may include a non-rechargeable primary battery, a rechargeable secondary battery, and/or a fuel cell.

The communication module ED90 may establish a direct (wired) communication channel and/or wireless communication channel between the electronic apparatus ED01 and another electronic apparatus (the electronic apparatus ED02, the electronic apparatus ED04, the server ED08, etc.), and support communication execution through the established communication channel. The communication module ED90 may include one or more communication processors that operate independently of the processor ED20 (application processor, etc.) and support direct communication and/or wireless communication. The communication module ED90 may include a wireless communication module ED92 (a cellular communication module, a short-range wireless communication module, a GNSS (Global Navigation Satellite System, etc.) communication module, and/or a wired communication module ED94 (a local area network (LAN) communication module, a power line communication module, etc.). A corresponding communication module of these communication modules may communicate with other electronic apparatuses through a first network ED98 (a short-range communication network such as Bluetooth, WiFi Direct, or infrared data association (IrDA)), or a second network ED99 (a long-range communication network such as a cellular network, Internet, or computer network (LAN, WAN, etc.)). These various types of communication modules may be integrated into a single component (such as a single chip, etc.), or may be implemented as a plurality of separate components (multiple chips). The wireless communication module ED92 may identify and authenticate the electronic apparatus ED01 in a communication network such as a first network ED98 and/or a second network ED99 using subscriber information (such as an international mobile subscriber identifier (IMSI) stored in the subscriber identification module ED96.

The antenna module ED97 may transmit a signal and/or power to the outside (such as another electronic apparatus, etc.) or receive the signal and/or power from the outside. The antenna may include a radiator formed of a conductive pattern formed on the substrate (PCB, etc.). The antenna module ED97 may include one or a plurality of antennas. In an example case in which a plurality of antennas are included, an antenna suitable for a communication scheme used in a communication network such as a first network ED98 and/or a second network ED99 may be selected from among the plurality of antennas by the communication module ED90. A signal and/or power may be transmitted or received between the communication module ED90 and another electronic apparatus through the selected antenna. Other components (RFIC, etc.) in addition to the antenna may be included as a part of the antenna module ED97.

Some of the components are connected to each other and may exchange signals (commands, data, etc.) via a communication scheme (bus, General Purpose Input and Output (GPIO), Serial Peripheral Interface (SPI), Mobile Industry Processor Interface (MIPI), etc.) and can interchange signals (commands, data, etc.) between peripherals.

The command or data may be transmitted or received between the electronic apparatus ED01 and the external electronic apparatus ED04 through the server ED08 connected to the second network ED99. Other electronic apparatuses ED02 and ED04 may be the same or different types of apparatuses as the electronic apparatus ED01. All or some of the operations executed in the electronic apparatus ED01 may be executed in one or more of the other electronic apparatuses ED02, ED04, and ED08. In an example case in which the electronic apparatus ED01 needs to perform a function or service, it may request one or more other electronic apparatuses to perform part or all of the function or service instead of executing the function or service on its own. One or more other electronic apparatuses receiving the request may execute an additional function or service related to the request and transmit a result of the execution to the electronic apparatus ED01. To this end, cloud computing, distributed computing, and/or client-server computing technology may be used.

Figure 13:
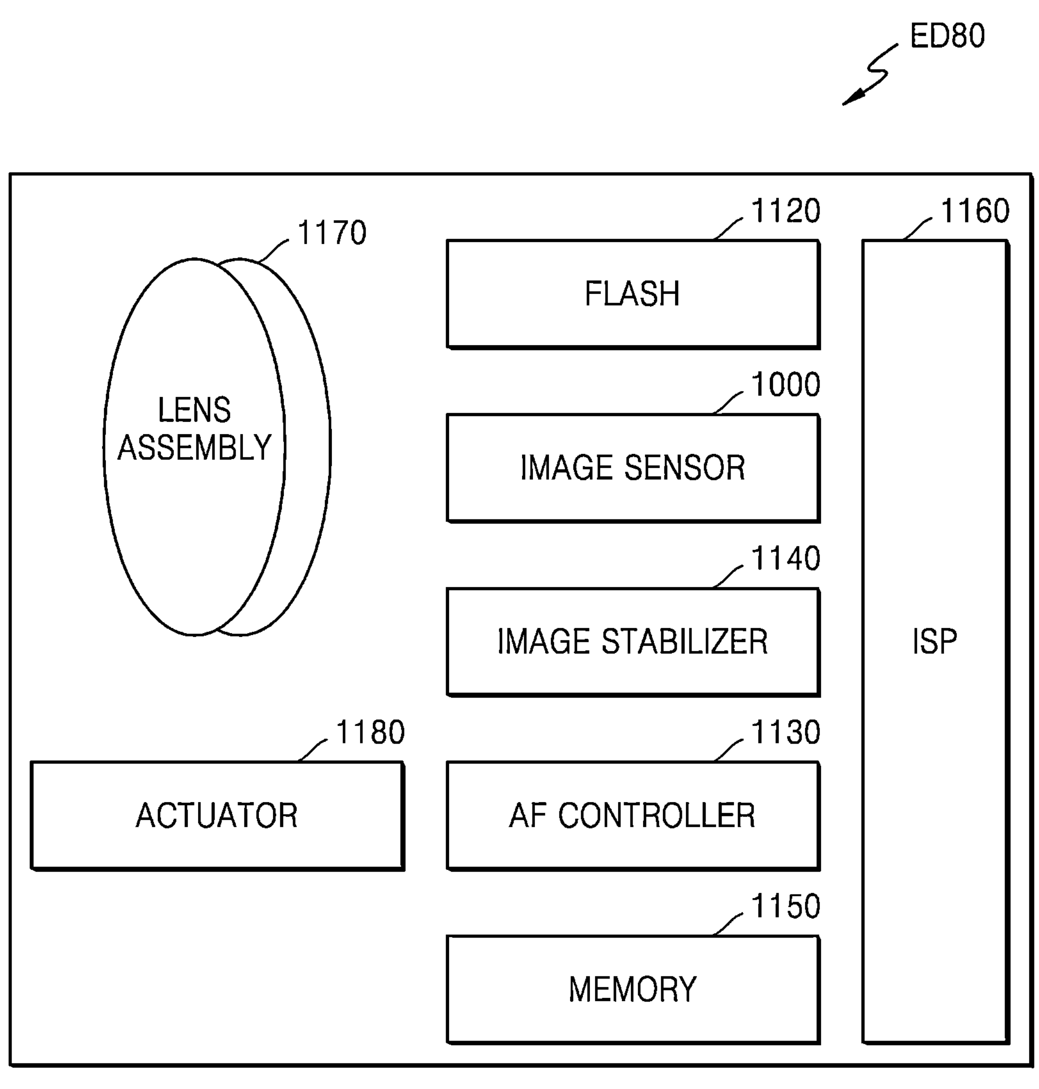
FIG. 13 is a schematic block diagram of a camera module provided in the electronic device of FIG. 12.

FIG. 13 is a schematic block diagram of a camera module ED80 provided in the electronic device ED01 of FIG. 12.

Referring to FIG. 13, the camera module ED80 may include a lens assembly 1170, a flash 1120, an image sensor 1000, an image stabilizer 1140, an auto-focus (AF) control unit 1130, a memory 1150 (buffer memory, etc.), an actuator 1180 and/or an image signal processor (ISP) 1160.

The lens assembly 1170 may collect light emitted from a subject that is an object of image photographing. The lens assembly 1170 may include one or more optical lenses. The lens assembly 1170 may include a path change member that changes the path of light to face the image sensor 1000. Depending on the arrangement of the path switching member and the arrangement form with the optical lens, the camera module ED80 may have a vertical form or a folded form. The camera module ED80 may include a plurality of lens assemblies 1170, and in this case, the camera module ED80 may be a dual camera, a 360° camera, or a spherical camera. Some of the plurality of lens assemblies 1170 may have the same lens attributes (view angle, focal distance, automatic focus, F Number, optical zoom, etc.) or other lens attributes. The lens assembly 1170 may include a wide-angle lens or a telephoto lens.

The actuator 1180 may drive the lens assembly 1170. For example, at least some of the optical lenses and the path switching members constituting the lens assembly 1170 may move by the actuator 1180. The optical lens may move along the optical axis and adjust the distance between adjacent lenses by moving at least part of the optical lenses included in the lens assembly 1170, thereby adjusting the optical zoom ratio.

The actuator 1180 may adjust the position of any one optical lens included in the lens assembly 1170 so that the image sensor 1000 is located at the focal length of the lens assembly 1170. The actuator 1180 may drive the lens assembly 1170 according to the AF driving signal transmitted from the AF controller 1130.

The flash 1120 may emit light used to enhance light emitted or reflected from the subject. The flash 1120 may emit visible light or infrared light. Flash (1120) may include one or more light-emitting diodes (RGB (Red-Green-Blue) LED, White LED, Infrared LED, Ultraviolet LED, etc.), and/or a Xenon Lamp. The image sensor 1000 may be the image sensor 1000 described with reference to FIG. 1, that is, any one of the various color separation lens arrays 130, and 130A to 130K described above, or a combination thereof, or a modified structure thereof. The image sensor 1000 may convert light emitted or reflected from a subject and transmitted through the lens assembly 1170 into an electrical signal, and obtain an image corresponding to the subject.

As described above, each pixel of the image sensor 1000 may include a plurality of light sensing cells forming a plurality of channels, for example, a plurality of light sensing cells arranged in 2×2. Some of these pixels may be used as AF pixels, and the image sensor 1000 may generate AF driving signals from signals from the plurality of channels in the AF pixels. Since the color separation lens array provided in the image sensor 1000 has a nano-post size and arrangement designed so that an auto-focus ratio increases, AF driving accuracy may be improved.

In response to the movement of the camera module ED80 or the electronic device ED01 including the same, the image stabilizer 1140 may move the one or more lenses or the image sensor 1000 included in the lens assembly 1170 in a specific direction or control an operation characteristic (adjustment of read-out timing and the like) of the image sensor 1000 to compensate for a negative impact caused by the movement. The image stabilizer 1140 may detect the movement of the camera module ED80 or the electronic device ED01 using a gyro sensor (not shown) or an acceleration sensor (not shown) placed inside or outside the camera module ED80. The image stabilizer 1140 may be implemented optically.

The AF controller 1130 may generate an AF driving signal from a signal value sensed from the AF pixel of the image sensor 1000. The AF controller 1130 may control the actuator 1180 according to the AF driving signal.

The memory 1150 may store some or all data of an image acquired through the image sensor 1000 for a next image processing operation. In an example case in which a plurality of images are acquired at high speed, the acquired original data (Bayer-Patterned data, high-resolution data, etc.) may be stored in memory 1150, only low-resolution images may be displayed, and the original data of the selected image may then be transmitted to the image signal processor 1160. The memory 1150 may be integrated into the memory ED30 of the electronic device ED01 or may be configured as a separate memory that is operated independently.

The ISP 1160 may perform image processes on image obtained through the image sensor 1000 or image data stored in the memory 1150. The image processing may include depth map generation, three-dimensional modeling, panoramic generation, feature point extraction, image synthesis, and/or image compensation (noise reduction, resolution adjustment, brightness adjustment, blurring, sharpening, softening, etc.). The image signal processor 1160 may perform control (exposure time control, read-out timing control, etc.) on components (image sensor 1000, etc.) included in the camera module ED80. The image processed by the image signal processor 1160 may be stored again in the memory 1150 for further processing or may be provided to external components (memory ED30, display device ED60, electronic device ED02, electronic device ED04, server ED08, etc.) of the camera module ED80. The image signal processor 1160 may be integrated into the processor ED20 or may be configured as a separate processor operated independently of the processor ED20. In the case that the image signal processor 1160 is including a separate processor from the processor ED20, the image processed by the image signal processor 1160 may be displayed through the display device ED60 after additional image processing by the processor ED20.

The AF controller 1130 may be integrated into the image signal processor 1160. The ISP 1160 processes signals from the auto-focusing pixels of the image sensor 1000 to generate AF signals, and the AF control unit 1130 may convert the AF signals into drive signals for driving the actuator 1180 and transmit the same to the actuator 1180.

The electronic device ED01 may further include one or more additional camera modules each having different attributes or functions. Such a camera module may also have a configuration similar to that of the camera module ED80 of FIG. 12, and the image sensor provided therein may be implemented as a charged coupled device (CCD) sensor and/or a complementary metal oxide semiconductor (CMOS) sensor, and may include one or more sensors selected from image sensors with different properties such as RGB sensors, black and white (BW) sensors, IR sensors, or UV sensors. In this case, one of the plurality of camera modules ED80 may be a wide-angle camera, and the other may be a telephoto camera. Similarly, one of the plurality of camera modules ED80 may be a front camera and the other may be a rear camera.

The image sensor 1000 according to embodiments may be applied to various electronic devices. The image sensor according to embodiments may be applied to a mobile phone or smart phone, a tablet or smart tablet, a digital camera or camera recorder referred to as a camcorder, a notebook computer or television or a smart television or augmented reality (AR) device, a virtual reality (VR) device, or the like. For example, the smartphone or smart tablet may include a plurality of high-resolution cameras each equipped with a high-resolution image sensor. High-resolution cameras may be used to extract depth information from subjects in the image, adjust the out-focusing of the image, or automatically identify subjects in the image.

In addition, the image sensor 1000 may be applied to a smart refrigerator, a security camera, a robot, a medical camera, and the like. For example, the smart refrigerator may automatically recognize food in the refrigerator using an image sensor and inform the user of the presence of a specific food, the type of food received or taken out, etc. through a smartphone. The security camera may provide an ultra-high-resolution image and may enable recognition of an object or person in the image even in a dark environment using high sensitivity. Robots may be deployed in disasters or industrial sites that are not directly accessible to humans to provide high-resolution images. Medical cameras may provide high-resolution images for diagnosis or surgery and may dynamically adjust the field of view.

In addition, the image sensor 1000 may be applied to a vehicle. The vehicle may include a plurality of vehicle cameras arranged in various positions. Each vehicle camera may include an image sensor according to an embodiment. The vehicle may provide a driver with various pieces of information about the interior or surroundings of the vehicle using a plurality of vehicle cameras, and may provide information necessary for autonomous driving by automatically recognizing an object or person in an image.

The image sensor and electronic device including the same described above have been described with reference to embodiments illustrated in the drawings.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image processing device comprising:

an image sensor comprising a unit block comprising a plurality of pixels arranged adjacent to each other, and a plurality of nano-posts arranged on the unit block; and a processor configured to process an input image acquired through the image sensor by: dividing the input image into a plurality of first sub-images of a Bayer pattern including pixels having a same parallax among the plurality of pixels included in the input image;

converting the plurality of first sub-images into a plurality of RGB demosaic images;

converting the plurality of RGB demosaic images into a plurality of YCbCr images comprising first luminance data and color difference data;

generating second luminance data by applying the first luminance data, from among the plurality of YCbCr images, to a super resolution algorithm;

generating third luminance data by upscaling the first luminance data;

generating fourth luminance data by performing a weighted sum operation on the second luminance data and the third luminance data based on an attention map generated by the super resolution algorithm;

acquiring a plurality of second YCbCr images by updating the first luminance data of the plurality of YCbCr images to the fourth luminance data; and generating an output image by merging a plurality of second sub-images generated based on the plurality of second YCbCr images.

2. The image processing device of claim 1, wherein the super resolution algorithm is an algorithm trained through a generator that learns a data distribution of a plurality of pieces of luminance data and a discriminator that learns to distinguish luminance data of an original image from luminance data generated by the generator.

3. The image processing device of claim 2, wherein the generator comprises a shallow feature extraction module, a deep feature extraction module, and a reconstruction module, and the reconstruction module comprises a sub-pixel convolution layer.

4. The image processing device of claim 3, wherein the shallow feature extraction module comprises at least one convolution layer configured to extract features for a low-resolution image from the plurality of pieces of luminance data input to the generator.

5. The image processing device of claim 3, wherein the deep feature extraction module comprises at least one residual block and at least one convolution layer configured to extract features for an ultra-high-resolution image from the plurality of pieces of luminance data input to the generator.

6. The image processing device of claim 3, wherein the reconstruction module is configured to generate the second luminance data by decoding, through the sub-pixel convolution layer, information in which first information extracted through the shallow feature extraction module and second information extracted through the deep feature extraction module are encoded.

7. The image processing device of claim 2, wherein the processor is further configured to:

acquire first data by multiplying, by the attention map, the second luminance data generated by passing the first luminance data through the generator;

acquire second data by multiplying a value obtained by subtracting the attention map from 1 by the third luminance data; and generate the fourth luminance data by summing the second data and the third data.

8. The image processing device of claim 1, wherein the attention map is generated by a texture identifier of the super resolution algorithm, the texture identifier being a network in which a data set for a plurality of textures have been trained, and the attention map comprises weight values of each of a plurality of labels labeled in the data set for the plurality of textures.

9. The image processing device of claim 1, wherein the unit block is arranged in a 2×2 matrix and comprises four pixels each comprising a color filter of a same color.

10. The image processing device of claim 1, wherein the unit block comprises a plurality of unit blocks, and wherein the image sensor has a quad Bayer pattern array in which the plurality of unit blocks are arranged in a 2×2 matrix.

11. The image processing device of claim 10, wherein the quad Bayer pattern array has one of an RGGB pattern, a GBRG pattern, a GRBG pattern, or a BGGR pattern.

12. The image processing device of claim 1, wherein the processor is further configured to:

convert the plurality of second YCbCr images into a plurality of final RGB images;

convert the plurality of final RGB images into the plurality of second sub-images; and generate the output image by merging the plurality of second sub-images.

13. An operating method of an image processing device, the operating method comprising:

acquiring an input image through an image sensor including a unit block including a plurality of pixels arranged adjacent to each other, and a plurality of nano-posts arranged on the unit block;

dividing the input image into a plurality of first sub-images of a Bayer pattern comprising pixels having a same parallax among the plurality of pixels included in the input image;

converting the plurality of first sub-images into a plurality of RGB demosaic images;

converting the plurality of RGB demosaic images into a plurality of YCbCr images comprising first luminance data and color difference data;

generating second luminance data by applying the first luminance data, from among the plurality of YCbCr images, to a super resolution algorithm;

generating third luminance data by upscaling the luminance data;

generating fourth luminance data by performing a weighted sum operation on the second luminance data and the third luminance data based on an attention map generated by the super resolution algorithm;

acquiring a plurality of second YCbCr images by updating the first luminance data of the plurality of YCbCr images to the fourth luminance data; and generating an output image by merging a plurality of second sub-images generated based on the plurality of second YCbCr images.

14. The operating method of claim 13, wherein the super resolution algorithm is an algorithm trained through a generator that learns a data distribution of a plurality of pieces of luminance data and a discriminator that learns to distinguish luminance data of an original image from luminance data generated by the generator.

15. The operating method of claim 14, wherein the generator comprises a shallow feature extraction module, a deep feature extraction module, and a reconstruction module, and the reconstruction module comprises a sub-pixel convolution layer.

16. The operating method of claim 15, wherein the shallow feature extraction module comprises at least one convolution layer configured to extract features for a low-resolution image from the plurality of pieces of luminance data input to the generator.

17. The operating method of claim 15, wherein the deep feature extraction module comprises at least one residual block and at least one convolution layer configured to extract features for an ultra-high-resolution image from the plurality of pieces of luminance data input to the generator.

18. The operating method of claim 15, wherein the reconstruction module configured to generate the second luminance data by decoding, through the sub-pixel convolution layer, information in which first information extracted through the shallow feature extraction module and second information extracted through the deep feature extraction module are encoded.

19. The operating method of claim 14, wherein the generating of the output image comprises:

converting the plurality of second YCbCr images into a plurality of final RGB images;

converting the plurality of final RGB images into the plurality of second sub-images; and generating the output image by merging the plurality of second sub-images.

20. The operating method of claim 13, wherein the generating of the fourth luminance data comprises:

acquiring first data by multiplying, by the attention map, the second luminance data generated by passing the first luminance data through the generator;

acquiring second data by multiplying a value obtained by subtracting the attention map from 1 by the third luminance data; and generating the fourth luminance data by summing the second data and the third data.

* * * * *